United States Patent
Amirijoo et al.

(10) Patent No.: US 8,095,143 B2
(45) Date of Patent: Jan. 10, 2012

(54) RANDOM ACCESS CHANNEL (RACH) RECONFIGURATION FOR TEMPORARILY EXTENDED CELL COVERAGE

(75) Inventors: Mehdi Amirijoo, Linköping (SE); Pål Frenger, Linköping (SE); Fredrik Gunnarsson, Linköping (SE); Johan Moe, Mantorp (SE); Kristina Zetterberg, Linköping (SE)

(73) Assignee: Telefonaktiebolaget L M Ericsson (SE)

( * ) Notice: Subject to any disclaimer, the term of this patent is extended or adjusted under 35 U.S.C. 154(b) by 440 days.

(21) Appl. No.: 12/371,083

(22) Filed: Feb. 13, 2009

(65) Prior Publication Data

US 2010/0210255 A1 Aug. 19, 2010

(51) Int. Cl.
*H04W 72/00* (2009.01)
*H04M 1/00* (2006.01)
(52) U.S. Cl. ........................... 455/452.1; 455/525
(58) Field of Classification Search .............. 455/525, 455/450, 452.1
See application file for complete search history.

(56) References Cited

U.S. PATENT DOCUMENTS

| | | | |
|---|---|---|---|
| 5,583,564 A | 12/1996 | Rao et al. | |
| 6,584,330 B1 | 6/2003 | Ruuska | |
| 7,013,141 B2 | 3/2006 | Lindquist et al. | |
| RE39,381 E * | 11/2006 | Hakkinen et al. | 455/525 |
| 7,353,030 B2 | 4/2008 | Singh | |
| 7,747,275 B2 * | 6/2010 | Funnell et al. | 455/525 |
| 2007/0190996 A1 | 8/2007 | Asthana et al. | |
| 2008/0064361 A1 | 3/2008 | Bjork et al. | |
| 2008/0192766 A1 * | 8/2008 | Ranta-Aho et al. | 370/445 |
| 2011/0124344 A1 * | 5/2011 | Gerstenberger et al. | 455/450 |

FOREIGN PATENT DOCUMENTS

| | | |
|---|---|---|
| GB | 2 299 916 A | 10/1996 |
| WO | WO 2006/044082 A2 | 4/2006 |
| WO | WO 2008/023919 A1 | 2/2008 |
| WO | WO 2008/115247 A1 | 9/2008 |
| WO | WO 2008/150206 A1 | 12/2008 |

OTHER PUBLICATIONS

PCT International Search Report corresponding to PCT/SE2010/050019, mailed May 21, 2010, 5 pages.
3GPP TSG-RAN WG1 Meeting Ad HOC LTE, "Rach Sequence Extension Methods for Large Cell Deployment", Aug. 28, 2006, 7 pages.
IEE Stevenage, "Strategies for Combating Base Station Failure in Highway Microcellular Clusters", vol. 24, No. 21., Oct. 13, 1988, 2 pages.
Written Opinion of the International Preliminary Examining Authority, PCT Application No. PCT/SE2010/050019, Jan. 26, 2011.
International Preliminary Report on Patentability, PCT Application No. PCT/SE2010/050019, Jun. 1, 2011.

* cited by examiner

*Primary Examiner* — James H Cho
(74) *Attorney, Agent, or Firm* — Myers Bigel Sibley & Sajovec, P.A.

(57) ABSTRACT

A device obtains a service change associated with a cell in a radio network, and identifies helper cells in the radio network that need new random access channel (RACH) parameters due to the service change. The device also determines a RACH parameters configuration for the helper cells, and configures the helper cells with the determined RACH parameters configuration.

19 Claims, 20 Drawing Sheets

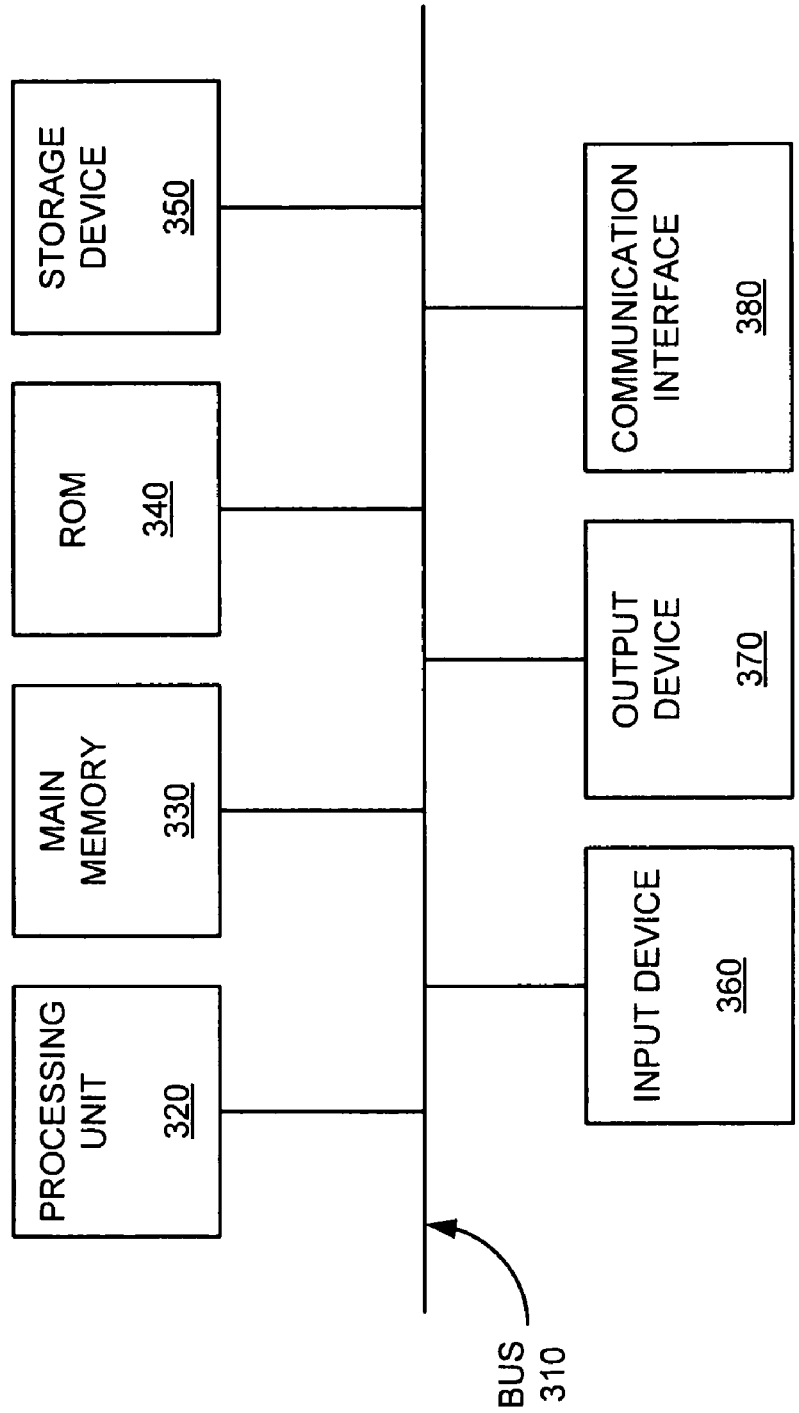

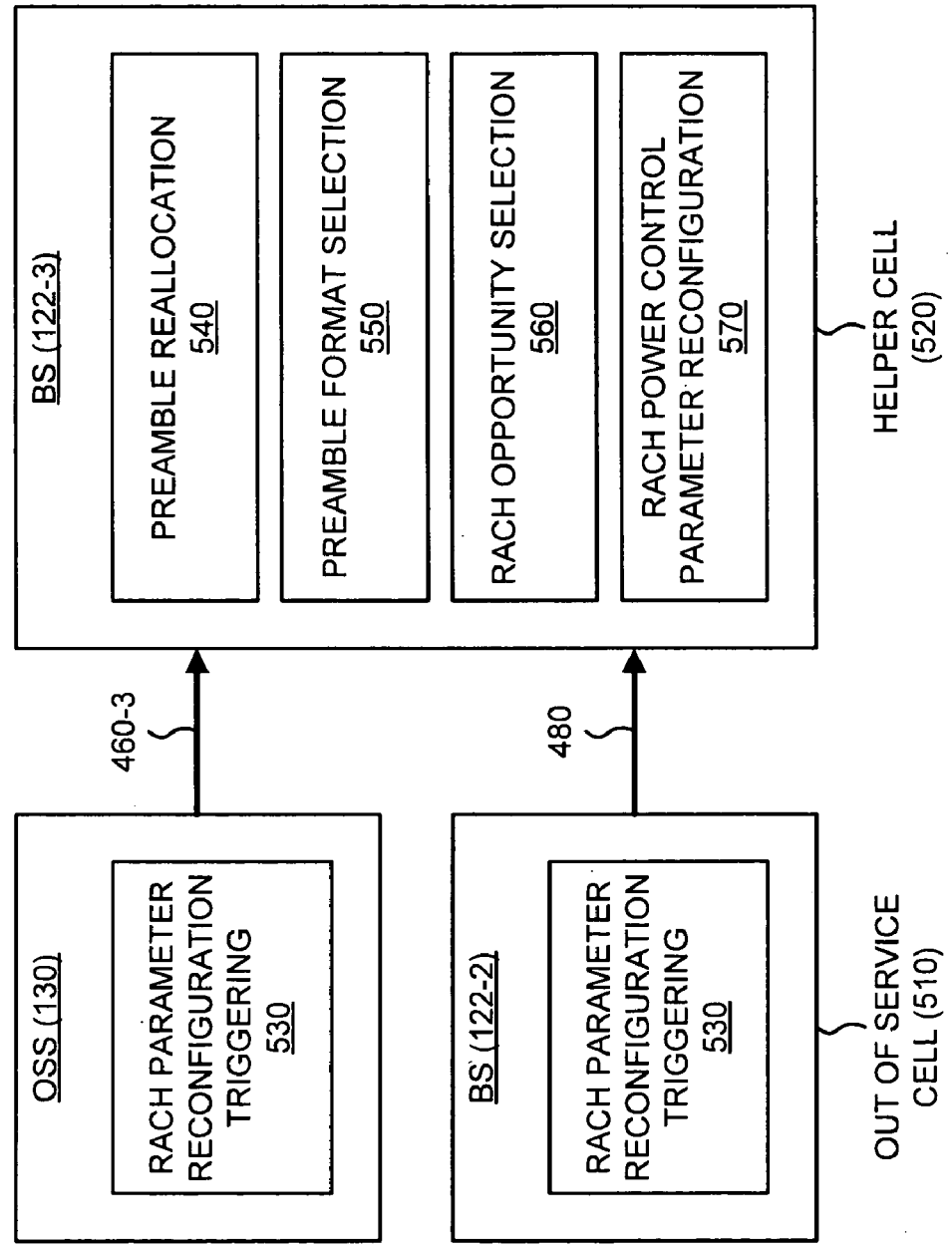

RANDOM ACCESS CHANNEL (RACH) RECONFIGURATION FOR TEMPORARILY EXTENDED CELL COVERAGE

TECHNICAL FIELD

Embodiments described herein relate generally to communication systems, and, more particularly, to a random access channel (RACH) reconfiguration for temporarily extended cell coverage in a telecommunication system.

BACKGROUND

The Third Generation Partnership Project (3GPP) is standardizing a first release of a Long Term Evolution (LTE) concept. An LTE system may include a number of base stations (also referred to as "Node Bs") connected to one or more mobility management entities/serving gateways (MME/S-GWs). A number of nodes (e.g., a network management system (NMS) node, an operation and support system (OSS) node, etc.) may provide operation and maintenance functionality for the base stations and/or the MMEs/S-GWs). In LTE, a downlink is based on orthogonal frequency division multiplexing (OFDM), while an uplink is based on a single carrier modulation method known as discrete Fourier transform spread OFDM (DFT-S-OFDM).

During initial access, user equipment (UE) seeks access to a network (e.g., a radio network) in order to register and commence services. A LTE random access (RA) procedure serves as an uplink control procedure to enable the UE to access the network. Since the initial access attempt cannot be scheduled by the network, the RA procedure is contention based. Collisions may occur and an appropriate contention-resolution scheme needs to be implemented. Including user data on the contention-based uplink is not spectrally efficient due to the need for guard periods and retransmissions. Therefore, transmission of a RA burst (e.g., a preamble) is separated. The RA burst obtains uplink synchronization from the transmission of user data.

The LTE RA procedure permits the UE to align its uplink timing to timing expected by a base station in order to minimize interference with other UE transmissions. Uplink time alignment is a requirement in an evolved universal terrestrial radio access network (E-UTRAN) before data transmissions can commence. The LTE RA procedure also provides a mechanism for the UE to notify the network of its presence and enables the base station to provide the UE initial access to the network. The LTE RA procedure is also used when the UE has lost uplink synchronization or when the UE is in an idle or a low-power mode.

The basic LTE RA procedure is a four-phase procedure. A first phase (e.g., phase 1) includes transmission of a random access preamble, which permits the base station to estimate the transmission timing of the UE. Uplink synchronization is necessary in the first phase since the UE otherwise cannot transmit uplink data. A second phase (e.g., phase 2) includes the network transmitting a timing advance command to correct uplink timing based on timing of an arrival measurement in the first phase. The second phase also assigns uplink resources and a temporary identifier to the UE to be used in a third phase of the LTE RA procedure. The third phase (e.g., phase 3) includes signaling from the UE to the network using an uplink shared channel (UL-SCH) similar to normally scheduled data. This UL-SCH signaling uniquely identifies the UE. The exact content of the UL-SCH signaling depends on the state of the UE (e.g., whether or not it is previously known to the network). A fourth phase (e.g., phase 4) is responsible for contention resolution in case multiple UEs try to access the network on the same resource. For cases where the network knows, in advance, that a particular UE will perform the LTE RA procedure to acquire uplink synchronization, a contention-free variety of the LTE RA procedure may be used that makes it possible to skip the contention resolution process of phases 3 and 4 (e.g., for cases such as arrival to a target cell at handover and arrival of downlink data). Each phase of the LTE RA procedure is explained in more detail below.

In the first phase of the LTE RA procedure, prior to sending a preamble, the UE synchronizes to the downlink transmissions and reads a broadcast channel (BCCH). The BCCH reveals where the RA time slots are located, which frequency bands can be used, and which preambles (e.g., sequences) are available. At the next RA slot, the UE sends the preamble, where the preamble sequence implicitly includes a random identification (ID) that identifies the UE. For each cell, LTE provides sixty-four such random IDs and thus sixty-four preambles. If multiple RA frequency bands have been defined, the UE randomly selects one of them. The group of sequences allocated to a cell is partitioned into two subgroups. By selecting a preamble sequence from a specific subgroup, the UE can give a single-bit indication of its resource requirement and/or link quality. The particular sequence used for the preamble is randomly selected within the desired subgroup. This sequence implicitly contains a random ID which serves as a UE identifier. The base station estimates the uplink timing of the UE based on the timing of the received preamble.

In the second phase of the LTE RA procedure, after the preamble transmission, the UE waits for a RA response message on a downlink shared channel (DL-SCH) and a downlink assignment which is indicated on a dedicated physical control channel (DPCCH). The RA response message is transmitted semi-synchronously (e.g., within a time window) with the reception of the RA preamble in order to allow a scheduler more flexibility. The RA response message includes the same random UE identity as present in the preamble, a time alignment message to provide a proper uplink timing to the UE, a radio network temporary identifier (RNTI) that is unique for the particular RA resource (e.g., time, channel, and preamble) used in phase 1, and an uplink resource grant for transmission on the UL-SCH in phase 3. If no RA response message has been received after a configurable time following the preamble transmission, the UE applies a backoff procedure. A backoff value in the UE (e.g., signaled to the UE in a past RA response message) delays the transmission to a randomly chosen time (e.g., between zero and the backoff value) before attempting random access again. The UE selects new random parameters for the preamble sequence and the non-synchronized RA frequency band. Furthermore, the UE increases a power level of the preamble to obtain a power ramping procedure (e.g., similar to the procedure used in wideband code division multiple access (WCDMA)).

In phase 3 of the LTE RA procedure, the UE provides the network with a unique identifier in the message it transmits on the UL-SCH according to a grant contained in the RA response message. The type of UE identifier depends on an extent the UE is already known in the network. In the case of initial access, the message is a radio resource control (RRC) connection request message. In the case of non-initial access (e.g., when the UE is already RRC connected), the UE identifier is a cell RNTI (C-RNTI) and is signaled by the media access control (MAC) layer.

In the fourth phase of the LTE RA procedure, the base station echoes the UE identity provided by the UE in phase 3. A terminal that finds a match between the identity received in the fourth phase and the identity transmitted as part of the third phase declares the LTE RA procedure successful. This terminal also transmits a hybrid automatic repeat request (HARQ) acknowledgement in the uplink. For non-initial access (e.g., when the UE is RRC connected), the UE identity is reflected on the DPCCH. If the UE has not yet been assigned a C-RNTI, the temporary identity from the second phase is promoted to the C-RNTI, otherwise the UE keeps its already assigned C-RNTI. Terminals that do not find a match between the identity received in phase 4 and the respective identity transmitted as part of phase 3 are considered to have failed the LTE RA procedure and need to restart the LTE RA procedure with phase 1.

For cases where the network knows, in advance, that a particular UE will perform the LTE RA procedure to acquire uplink synchronization, a dedicated preamble is reserved and assigned to the UE under consideration. Dedicated preamble assignment for handover is handled by RRC, whereas preamble assignment for downlink data arrival is handled by the MAC layer. When the UE transmits the dedicated preamble in phase 1, the network knows to which UE this preamble was assigned and can, at the time of detection of this preamble, determine the identity of the UE. Thus, no contention resolution is needed and the delay before data transmission can resume is reduced.

A single RA opportunity includes a time slot and a fixed bandwidth. The RA time slot length ($T_{RA}$) accommodates the preamble sent by the UE and the required guard period (GP) to take into account the unknown uplink timing. The timing misalignment amounts to "6.7" microseconds per kilometer (μs/km). For a minimum $T_{RA}$ of one millisecond (ms), the preamble length is "800" μs plus a cyclic prefix of about "102.5" μs. A guard time of "97.5" μs suffices for cell radii up to fifteen km. Larger guard periods and a cyclic prefix are needed to accommodate timing uncertainties from cells larger than fifteen km. Such large cells may also require longer preambles to increase the received energy. In order to support RA under various cell conditions, three additional RA preamble formats have been defined that require a $T_{RA}$ of two or even three milliseconds. These larger slots are created when the base station does not schedule traffic in consecutive sub-frames. The extended preambles contain repetitions of the "800" μs long part and/or a longer cyclic prefix.

For time division duplex (TDD) systems, an additional short RA preamble is defined and spans "133" μs. Because of this very short duration, the preamble may not contain a cyclic prefix but a technique called overlap-and-add may be used to enable frequency-domain processing.

According to 3GPP, the bandwidth of a RA opportunity is "1.08" megahertz (MHz). The effective bandwidth utilized by the RA preamble is "1.05" MHz with small spectral guard bands on each side. This is necessary since RA and regular uplink data are separated in the frequency domain but are not completely orthogonal.

For frequency division duplex (FDD) systems, RA opportunities do not occur simultaneously in different frequency bands but are separated in time. This spreads processing load in a RA receiver. 3GPP defines RA configurations based on how often RA opportunities occur. In total, sixteen configurations are defined, ranging from one RA opportunity every twenty milliseconds (e.g., a very low RA load) to one RA opportunity every one millisecond (e.g., very high RA load).

In TDD, not all sub-frames are downlink reducing sub-frames that can be allocated to RA. To provide such sub-frames in TDD configurations for high RA loads, multiple RA opportunities can be scheduled in a single sub-frame. In order to compensate for the rather low frequency diversity obtained within "1.05" MHz, the RA opportunity hops in the frequency domain. The time division multiple access (TDMA)/frequency division multiple access (FDMA) structure of the RA opportunities in FDD includes one "1.08" MHz band allocated to RA at each time whereas several bands are possible in case of TDD. The RA opportunities occur at the band edges of the physical uplink shared channel (PUSCH) directly adjacent to the physical uplink control channel (PUCCH).

A basic RA preamble is prefixed with a cyclic prefix to enable simple frequency domain processing. The length of the RA preamble is in the order of $T_{GP}+T_{DS}=97.5$ μs+5 μs=102.5 μs, where $T_{GP}$ corresponds to a maximum round trip time and $T_{DS}$ corresponds to a maximum delay spread. The cyclic prefix ensures that a received signal is circular (e.g., after removing the CP in the RA receiver) and thus can be processed by fast Fourier transforms. Therefore, an active RA preamble duration is 1000 μs−2·$T_{GP}$−$T_{DS}$=800 μs. A RA subcarrier spacing is 1/800 μs=1250 Hz.

The RA preamble may include extended preamble formats. A first extended preamble format (e.g., format 1) has an extended cyclic prefix and is suited for cell radii up to approximately "100" km. However, since no repetition occurs, this format is only suited for environments with good propagation conditions. A second preamble format (e.g., format 2) contains a repeated main preamble and a cyclic prefix of approximately "200" μs. With a RA opportunity length of two milliseconds, the remaining guard period is also approximately "200" μs. This format supports cell radii of up to approximately "30" km. A third preamble format (e.g., format 3) also contains a repeated main preamble and an extended cyclic prefix. Using a RA opportunity length of three milliseconds, this format supports cell radii of up to approximately "100" km. As opposed to format 1, format 3 contains a repeated preamble and is therefore better suited for environments with bad propagation conditions.

The requirements of a sequence that includes the RA preamble are two-fold: good auto-correlation function (ACF) properties and good cross-correlation function (CCF) properties. A sequence that has ideal periodic ACF and CCF properties is the Zadoff-Chu sequence. The periodic ACF of the Zadoff-Chu sequence is non-zero at time-lag zero and the magnitude of the CCF is equal to the square-root of the sequence length (N). Due to special properties of Zadoff-Chu sequences, a number of sequences is maximized if N is a prime number. This together with the requirement that the effective RA bandwidth (e.g., N·1250 Hz) fit into "1.05" MHz, leads to N=839.

A Zadoff-Chu sequence of length N can be expressed, in the frequency domain, as:

$$X_{ZC}^{(u)}(k) = e^{-j\pi u \frac{k \cdot (k+1)}{N}},$$

where "u" is the index of the Zadoff-Chu sequence within the set of Zadoff-Chu sequences of length N. From one Zadoff-Chu sequence, multiple preamble sequences can be derived by cyclic shifting. Due to the ideal ACF of Zadoff-Chu sequence, multiple and mutually orthogonal sequences can be derived from a single root sequence by cyclic shifting one root sequence multiple times a maximum allowed round trip time plus a delay spread in the time domain. The correlation of such a cyclic shifted sequence and the underlying root sequence has a peak at the cyclic shift. If the received signal has a valid round trip delay (e.g., not larger than a maximum assumed round trip time), the correlation peak occurs at the cyclic shift plus the round trip delay which is still in the correct correlation zone. For small cells (e.g., up to "1.5" km radii), all sixty-four preambles can be derived from a single root sequence and are therefore orthogonal to each other. In larger cells, all of the preambles cannot be derived from a single root sequence and multiple root sequences must be allocated to a cell. Preambles derived from different root sequences are not orthogonal to each other.

One disadvantage of Zadoff-Chu sequences is their behavior at high frequency offsets. A frequency offset creates an additional correlation peak in the time domain. A frequency offset has to be considered high if it becomes substantial relative to the RA sub-carrier spacing of "1250" Hz (e.g., from "400" Hz upwards). The offset of the second correlation peak relative to the main peak depends on the root sequence. An offset smaller than a cyclic shift ($T_{CS}$) may lead to wrong timing estimates, whereas values larger than $T_{CS}$ increase a false alarm rate. In order to cope with this problem, LTE has a high speed mode that disables certain cyclic shift values and root sequences so that a transmitted preamble and round trip time can uniquely be identified. Additionally a special receiver that combines both correlation peaks is required. For cells larger than approximately "35" km, no set of sixty-four preambles exists that allows unique identification of the transmitted preamble and estimation of propagation delay (i.e., cells larger than "35" km cannot be supported in high speed mode).

The RA preamble sequences are ordered according to a specified table. The table is designed by separating all packet random access channel (PRACH) sequences into two groups based on a quadrature phase-shift keying (QPSK) cubic metric value using a fixed "1.2" decibel (dB) threshold. The sequences with low cubic metric values are more suitable to assign to large cells than the sequences with high cubic metric values. Within each cubic metric-group (e.g., high and low), the sequences are further grouped according to a maximum allowed cyclic shift ($S_{max}$) at high speed.

In LTE, power control for RACH is determined as follows:

$$P_{RACH}(N)=\min\{P_{MAX}, P_{O\_RACH}+PL+(N-1)\Delta_{RACH}+\Delta_{Preamble}\},$$

where $P_{RACH}$ is the preamble transmit power, N=1, 2, 3, etc. is a RACH attempt number, $P_{MAX}$ is a maximum UE power, $P_{O\_RACH}$ is a four-bit cell specific parameter signaled via BCCH with a granularity of two dB, PL is a path loss estimated by the UE, $\Delta_{RACH}$ is a power ramping step signaled via BCCH and represented by two bits (four levels) with a granularity of two dB, and $\Delta_{preamble}$ is a preamble-based offset that is zero for a single preamble transmission and is −3 dB for repeated preambles. The UE will increase its transmission power until network access is granted. There is typically an upper bound (e.g., $N_{MAX}$) on a number of retransmissions and, thus, a number of power increases.

For optimized operation and performance of RACH, RACH related parameters are cell-specifically configured to adapt the radio conditions and interference situations in the individual cells. This may be achieved by careful radio network planning. However, such a procedure is time-consuming and costly. An alternative is to adjust the RACH parameters via self-optimizing algorithms based on observations in the network. With such settings, the RACH parameters match: an intended cell coverage by preamble cyclic shifts, preamble formats (e.g., a length of cyclic prefix and whether the preamble is repeated or not), power control persistence, and the cubic metric of the root sequences; expected UE velocities by using (or not using) high speed mode preambles; an expected RACH load by the number of RACH opportunities; a detection threshold and an expected interference and noise level by the power control parameters ($P_{O\ RACH}$); an expected path loss estimation error and interference uncertainty by the power control parameters ($\Delta_{RACH}$); and RACH requirements received from an operator. This means that for optimized performance, the RACH will not provide better coverage and communication performance than requested.

A specific cell associated with a base station (or the base station) can be temporarily unable to provide service to users in a service area. Service may be unavailable because of, for example, malfunctioning equipment, power outage, transport network failure, etc. This is commonly referred to as "cell outage," "broken cell," "downed cell," "faulty cell," "out of service cell," "vulnerable cell," "malfunctioning cell," "failed cell," etc. or another corresponding term if the base station, a site, or a network element is out of service. Furthermore, a cell or a base station may be out of service because of a decision from some mechanism (e.g., to prepare the cell or base station for upgrades, when the need for service is low, such as during low traffic times when it is desirable to shut down network elements to save power, etc.). Such network elements may be referred to as sleeping, dormant, latent, inactive, idle, turned off, shut down, terminated, halted, stopped, ceased, paused, suspended, interrupted, etc. The term "out of service" may be used to indicate a network element that is out of service for any reason (e.g., intended or unintended).

When one or several cells are out of service, surrounding cells may, to some extent, act as replacements for out of service cells or base stations. However, there is a considerable risk that UEs (e.g., mobile telephones) fail to attach to these replacement cells since the UEs' RACH parameters are configured too tightly and only provide coverage in an intended coverage area, given the radio conditions, interference variations, and random access load. For example, three base stations A, B, and C may provide cell coverage that matches RACH coverage. When base station B is out of service, then either base station A or base station C may constitute favorable replacement cells based on downlink evaluations and cell search procedures. However, base stations A and/or C may not be able to serve all UEs formerly served by base station B due to insufficient RACH coverage.

SUMMARY

It is an object of the invention to overcome at least some of the above disadvantages, to reconfigure RACH parameters for extended coverage in cells surrounding a cell that is out of service, and to select cells to be reconfigured based on information provided in neighbor cell relation lists.

Embodiments described herein may provide systems and/or methods that provide a RACH reconfiguration for temporarily extended cell coverage. The RACH reconfiguration may include RACH parameter reconfiguration triggering that may be implemented based on service change information (e.g., out of service) about a cell (or base station) in a radio network. Alternatively and/or additionally, the RACH reconfiguration may include one or more of preamble reallocation, preamble format selection, RACH opportunity selection, and/or RACH power control parameter reconfiguration. An "out of service cell," as used herein, is to be broadly construed to include one or more cells, one or more base stations, one or more portions of a cell, and/or one or more portions of a base station that may be out of service, partially out of service, malfunctioning, partially malfunctioning, etc.

In one exemplary implementation of this embodiment, the systems and/or methods may obtain a service change associated with a cell in a radio network, and may identify other cells (e.g., "helper" cells) in the radio network that need new RACH parameters due to the service change. The systems and/or methods may determine a RACH parameters configuration for the helper cells, and may configure the helper cells with the determined RACH parameters configuration.

In another exemplary implementation of this embodiment, the systems and/or methods may receive information indicating a cell in a radio network is out of service, and may trigger a RACH parameters reconfiguration for a helper cell based on the received information. Alternatively and/or additionally, the systems and/or methods may reallocate preambles associated with the RACH parameters, may select a preamble format associated with the RACH parameters, may select a RACH opportunity associated with the RACH parameters, and/or may reconfigure a RACH power control parameter.

Systems and/or methods described herein may support a random access procedure for cells with temporarily extended coverage. In one example, the systems and/or methods may support the random access procedure in self-healing cases when some cells extend coverage in order to attract traffic from a service area of a malfunctioning cell or base station. In another example, the systems and/or methods may support the random access procedure when cells are disabled (e.g., out of service) during low traffic times, particular days of the week, etc., when cells are disabled for maintenance, and/or when other cells are reconfigured in order to receive traffic from the disabled cells.

BRIEF DESCRIPTION OF THE DRAWINGS

FIG. 3 depicts a diagram of exemplary components of a mobility management entity/serving gateway (MME/S-GW), an operation and support system (OSS), and/or a network management system (NMS) illustrated in FIG. 1;

FIG. 5 depicts a diagram of exemplary RACH parameters reconfiguration signaling among components of an exemplary portion of the network illustrated in FIG. 1;

DETAILED DESCRIPTION

The following detailed description refers to the accompanying drawings. The same reference numbers in different drawings may identify the same or similar elements. Also, the following detailed description does not limit the invention.

Embodiments described herein may provide systems and/or methods that reconfigure RACH parameters for extended coverage in cells surrounding a cell that is out of service, and that select cells to be reconfigured based on information provided in neighbor cell relation lists.

Figure 1:
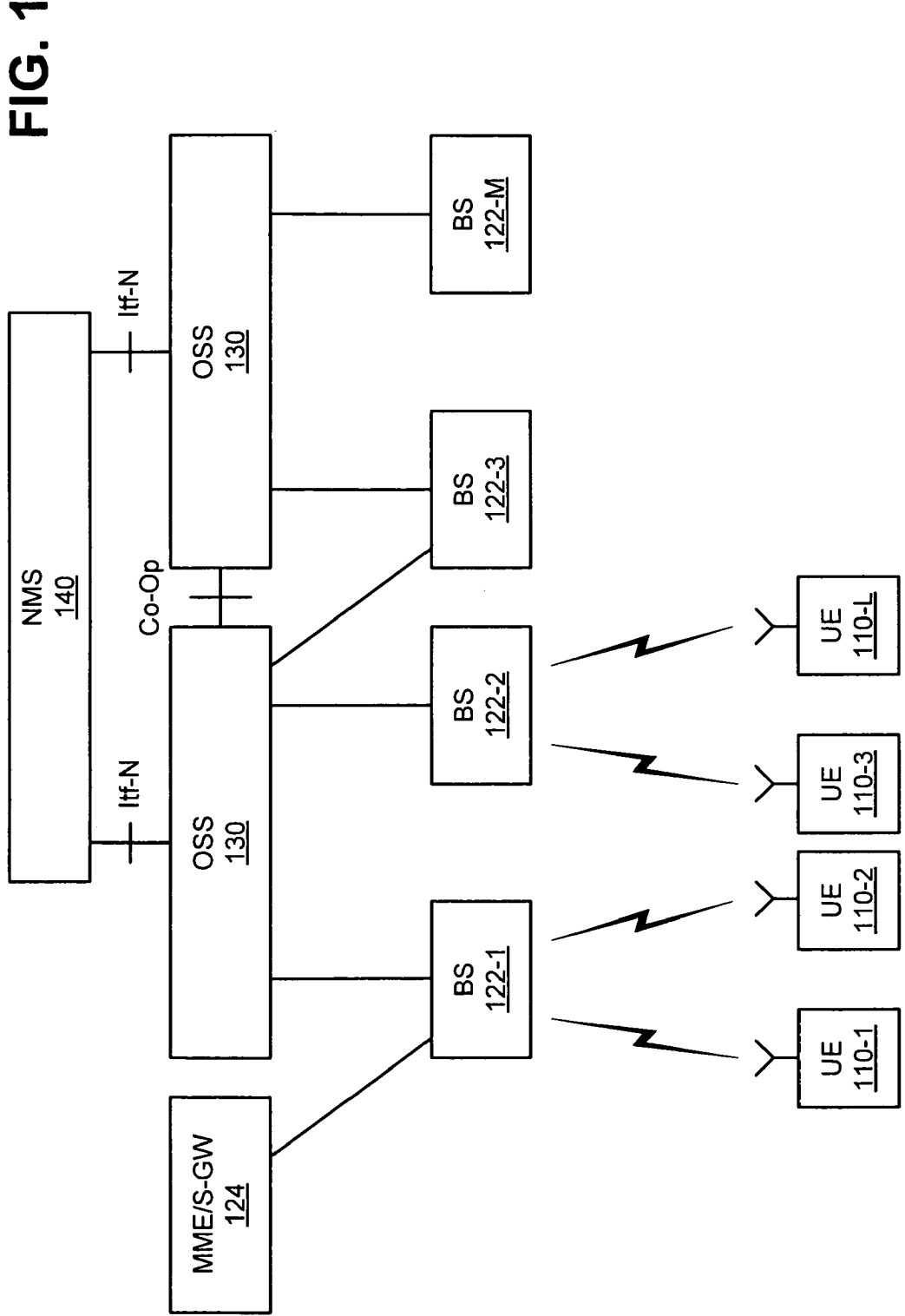
FIG. 1 depicts a diagram of an exemplary network in which systems and/or methods described herein may be implemented.

FIG. 1 depicts a diagram of an exemplary network 100 in which systems and/or methods described herein may be implemented. As shown, network 100 may include a group of user equipment (UE) 110-1 through 110-L (referred to collectively, and in some instances individually, as "user equipment 110"), a group of base stations (BSs) 122-1 through 122-M (referred to collectively as "base stations 122" and in some instances, individually as "base station 122"), a mobility management entity/serving gateway (MME/S-GW) 124, two operation and support systems (OSSs) 130 (referred to individually as "OSS 130"), and a network management system (NMS) 140. Four pieces of user equipment 110, four base stations 122, a single MME/S-GW 124, two OSSs 130, and a single NMS 140 have been illustrated in FIG. 1 for simplicity. In practice, there may be more UEs 110, base stations 122, MME/S-GWs 124, OSSs 130, and/or NMSs 140. Also, in some instances, a component in network 100 (e.g., one or more of user equipment 110, base stations 122, MME/S-GW 124, OSS 130, and NMS 140) may perform one or more functions described as being performed by another component or group of components in network 100.

User equipment 110 may include one or more devices capable of sending/receiving voice and/or data to/from base stations 122. User equipment 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a laptop computer, etc.

In one embodiment, user equipment 110 may be associated with a cell provided by one of base stations 122 (e.g., base station 122-2). If the cell provided by base station 122-2 enters an out of service state (e.g., is disabled), user equipment 110 may receive temporarily extended cell coverage from other base stations (e.g., base stations 122-1 and 122-3). The other base stations may extend cell coverage to user equipment 110 based on a RACH parameters reconfiguration for the extended cell coverage.

Base stations 122 (also referred to as "Node Bs") may include one or more devices that receive voice and/or data from MME/S-GW 124 and/or OSSs 130 and transmit that voice and/or data to user equipment 110 via an air interface. Base stations 122 may also include one or more devices that receive voice and/or data from user equipment 110 over an air interface and transmit that voice and/or data to MME/S-GW 124 and/or OSSs 130 or other user equipment 110.

MME/S-GW 124 may include one or more devices that control and manage base stations 122. MME/S-GW 124 may route and forward user data packets, act as a mobility anchor for the user plane during inter-base station handovers, and act as an anchor for mobility between LTE and other 3GPP technologies. For idle state user equipment, MME/S-GW 124 may terminate a downlink data path and may trigger paging when downlink data arrives for the user equipment. MME/S-GW 124 may manage and store user equipment contexts (e.g., parameters of an Internet protocol (IP) bearer service, network terminal routing information, etc.), and may perform replication of user traffic in case of lawful interception. MME/S-GW 124 may provide an idle mode user equipment tracking and paging procedure that includes retransmissions. MME/S-GW 124 may be involved in a bearer activation/deactivation process and may be responsible for choosing a serving gateway for user equipment at an initial connection and at a time of intra-LTE handover. MME/S-GW 124 may be responsible for authenticating a user and for generating and allocating temporary identities to user equipment. MME/S-

GW 124 may check for authorization of user equipment to camp on a service provider's public land mobile network (PLMN) and may enforce roaming restrictions.

OSS 130 may include one or more devices that control and manage base stations 122. OSS 130 may also include devices that perform data processing to manage utilization of radio network services. OSS 130 may transmit/receive voice and data to/from base stations 122, other OSSs 130, and/or NMS 140. OSS 130 may support processes such as maintaining network inventory, provisioning services, configuring network components, and/or managing faults. In one embodiment, OSS 130 may provide services for network 100, such as order processing, accounting, billing and cost management, network inventory, service provision, network design, network discovery and reconciliation, trouble and fault management, capacity management, network management, field service management, etc.

NMS 140 may include one or more devices that monitor and administer network 100. NMS 140 may provide services, such as operation, maintenance, administration, and/or provisioning of network 100. With regard to operation of network 100, NMS 140 may ensure that network 100 operates smoothly, may monitor for any faults that may occur during operation of network 100, and may try to catch and fix the faults before any users of network 100 are affected by the faults. With regard to administration of network 100, NMS 140 may track resources associated with network 100 and may determine how the resources are assigned to the users of network 100. NMS 140 may provide maintenance of network 100 by handling upgrades and repairs that are needed for components of network 100 and by adjusting device configuration parameters so that network 100 operates more smoothly. NMS 140 may provide provisioning of network 100 by configuring the resources in network 100 to support new customers that may need a service provided by network 100. In one embodiment, NMS 140 may control, plan, allocate, deploy, coordinate, and monitor the resources of network 100, and may provide network planning, frequency allocation, predetermined traffic routing to support load balancing, configuration management, accounting management, bandwidth management, performance management, security management, and/or fault management for network 100.

As illustrated in FIG. 1, an OSS 130 may connect to NMS 140 via an Itf-N open interface and to another OSS 130 via a Co-Op open interface.

In one embodiment, one of base stations 122 and/or OSS 130 may obtain a service change associated with a cell (or base station 122) in network 100, and may identify other cells (e.g., "helper" cells or base stations 122) in network 100 that need new RACH parameters due to the service change. Base stations 122 and/or OSS 130 may determine a RACH parameters configuration for the helper cells, and may configure the helper cells with the determined RACH parameters configuration.

Figure 2:
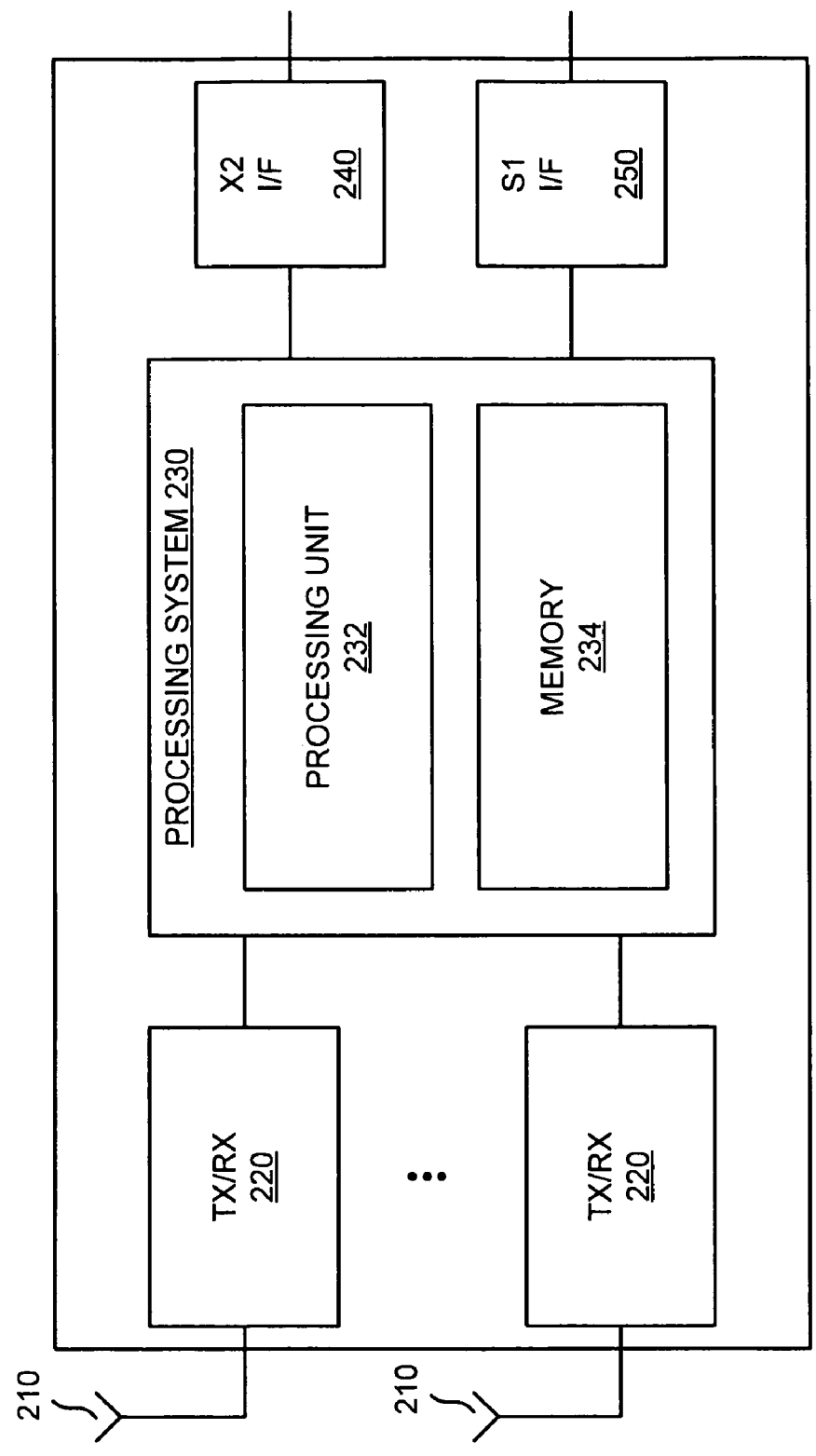
FIG. 2 illustrates a diagram of exemplary components of a base station depicted in FIG. 1.

FIG. 2 illustrates a diagram of exemplary components of base station 122. As shown in FIG. 2, base station 122 may include antennas 210, transceivers (TX/RX) 220, a processing system 230, an X2 interface (I/F) 240, and a S1 interface (I/F) 250.

Antennas 210 may include one or more directional and/or omni-directional antennas. Transceivers 220 may be associated with antennas 210 and may include transceiver circuitry for transmitting and/or receiving symbol sequences in a network, such as network 100, via antennas 210.

Processing system 230 may control the operation of base station 122. Processing system 230 may also process information received via transceivers 220, X2 interface 240, and/or S1 interface 250. Processing system 230 may further measure quality and strength of a connection, may determine the frame error rate (FER), and may transmit this information to MME/S-GW 124 and/or OSS 130. As illustrated, processing system 230 may include a processing unit 232 and a memory 234.

Processing unit 232 may include one or more processors, microprocessors, application specific integrated circuits (ASICs), field programmable gate arrays (FPGAs), or the like. Processing unit 232 may process information received via transceivers 220, X2 interface 240, and/or S1 interface 250. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 232 may transmit control messages and/or data messages, and may cause those control messages and/or data messages to be transmitted via transceivers 220, X2 interface 240, and/or S1 interface 250. Processing unit 232 may also process control messages and/or data messages received from transceivers 220, X2 interface 240, and/or S1 interface 250.

Memory 234 may include a random access memory (RAM), a read-only memory (ROM), and/or another type of memory to store data and instructions that may be used by processing unit 232.

X2 interface 240 may include one or more line cards that allow base station 122 to transmit data to and receive data from another base station 122. S1 interface 250 may include one or more line cards that allow base station 122 to transmit data to and receive data from MME/S-GW 124 and/or OSS 130.

As described herein, base station 122 may perform certain operations in response to processing unit 232 executing software instructions of an application contained in a computer-readable medium, such as memory 234. A computer-readable medium may be defined as a physical or logical memory device. A logical memory device may include memory space within a single physical memory device or spread across multiple physical memory devices. The software instructions may be read into memory 234 from another computer-readable medium or from another device via antennas 210 and transceivers 220. The software instructions contained in memory 234 may cause processing unit 232 to perform processes described herein. Alternatively, hardwired circuitry may be used in place of or in combination with software instructions to implement processes described herein. Thus, embodiments described herein are not limited to any specific combination of hardware circuitry and software.

Although FIG. 2 shows exemplary components of base station 122, in other embodiments, base station 122 may contain fewer, different, differently arranged, or additional components than depicted in FIG. 2. In still other embodiments, one or more components of base station 122 may perform one or more other tasks described as being performed by one or more other components of base station 122.

FIG. 3 depicts a diagram of exemplary components of a device 300 that may correspond to MME/S-GW 124, OSS 130, and/or NMS 140. As illustrated, device 300 may include a bus 310, a processing unit 320, a main memory 330, a ROM 340, a storage device 350, an input device 360, an output device 370, and/or a communication interface 380. Bus 310 may include a path that permits communication among the components of device 300.

Processing unit 320 may include one or more processors, microprocessors, or other types of processors that may interpret and execute instructions. Main memory 330 may include a RAM or another type of dynamic storage device that may store information and instructions for execution by processing unit 320. ROM 340 may include a ROM device or another type of static storage device that may store static information and/or instructions for use by processing unit 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, a touch screen, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as network 100.

As described herein, device 300 may perform certain operations in response to processing unit 320 executing software instructions contained in a computer-readable medium, such as main memory 330. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other embodiments, device 300 may contain fewer, different, or additional components than depicted in FIG. 3. In still other embodiment, one or more components of device 300 may perform one or more other tasks described as being performed by one or more other components of device 300.

FIGS. 4A-4D depict diagrams of exemplary interactions among components of an exemplary portion 400 of network 100. As illustrated, exemplary network portion 400 may include user equipment 110-2, base stations 122-1, 122-2, and 122-3, and OSS 130. User equipment 110-2 may include the features described above in connection with, for example, FIG. 1. Base stations 122-1, 122-2, and 122-3 may include the features described above in connection with, for example, FIGS. 1 and 2. OSS 130 may include the features described above in connection with, for example, FIGS. 1 and 3.

Figure 4A:
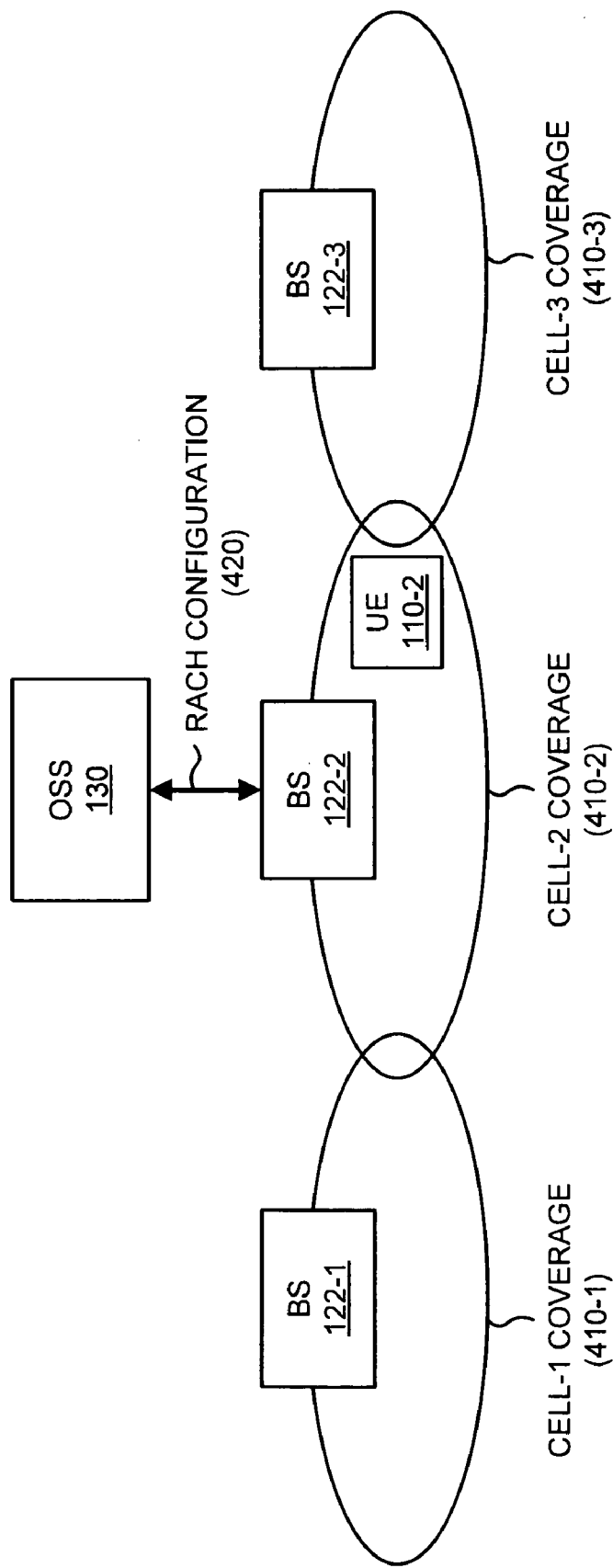
FIGS. 4A-4D illustrates diagrams of exemplary interactions among components of an exemplary portion of the network depicted in FIG. 1.

As shown in FIG. 4A, base station 122-1 may provide a first cell coverage area (CELL-1 COVERAGE) 410-1, base station 122-2 may provide a second cell coverage area (CELL-2 COVERAGE) 410-2, and base station 122-3 may provide a third cell coverage area (CELL-3 COVERAGE) 410-3. User equipment 110-2 may currently reside in second cell coverage area 410-2 provided by base station 122-2. As further shown in FIG. 4A, base station 122-2 and OSS 130 may communicate a RACH configuration 420 that matches an intended cell coverage area provided by base station 122-2 (e.g., second cell coverage area 410-2).

Figure 4B:
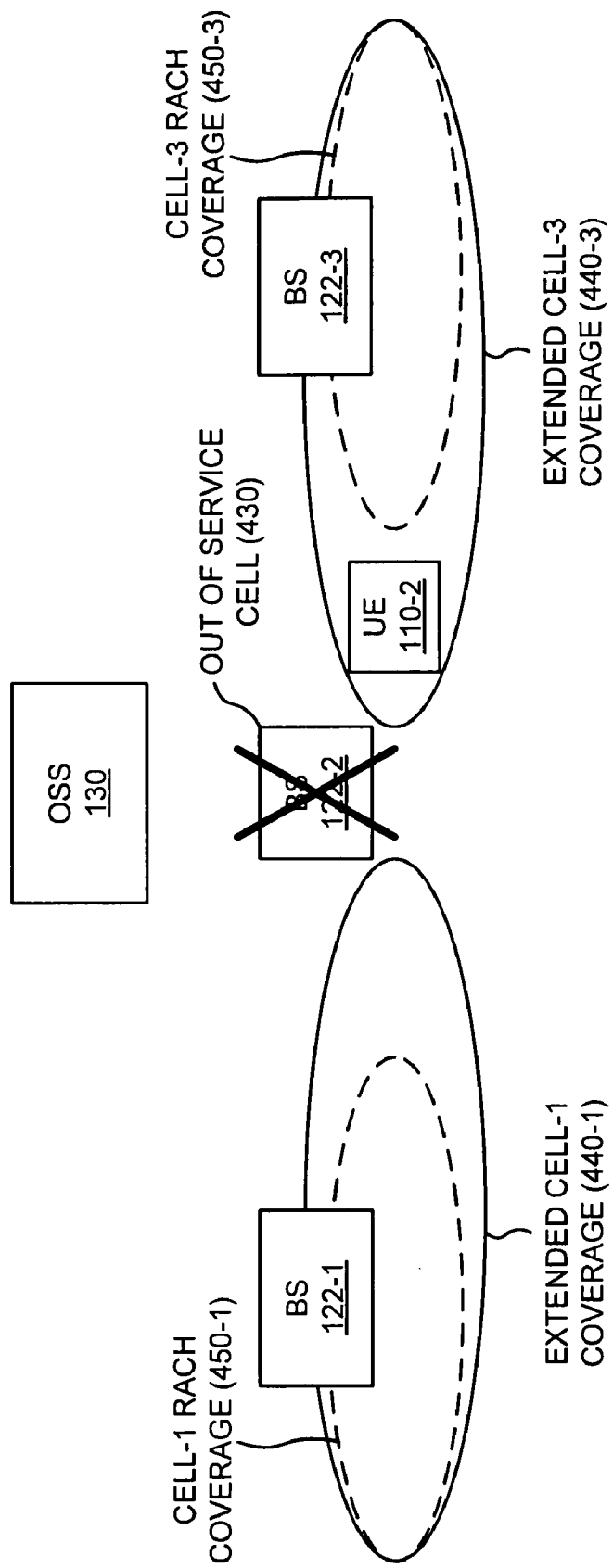

As shown in FIG. 4B, if base station 122-2 is out of service (e.g., because of a decision from some mechanism, such as to prepare a cell or base station 122-2 for upgrades, when the need for service is low, such as during low traffic times and it is desirable to shut down network elements to save power, etc.), as indicated by reference number 430, base station 122-2 may be unable to serve user equipment 110-2 in second cell coverage area 410-2. In one embodiment, it may be determined that an out of service cell or an out of service base station (e.g., base station 122-2) is unable to serve user equipment (e.g., user equipment 110-2) in its intended coverage area. An out of service base station (e.g., base station 122-2) may be considered as a number of out of service cells. The determination may be made by the out of service base station (e.g., base station 122-2), a MME/S-GW (e.g., MME/S-GW 124) connected to the out of service base station, and/or another node of network 100 (e.g., OSS 130, NMS 140, etc.). When an out of service cell (e.g., base station 122-2) is determined to be unable to fulfill its tasks, a set of alternative (or "helper") cells in the vicinity of the out of service cell may be determined (e.g., by base station 122-2, MME/S-GW 124, OSS 130, NMS 140, etc.) based on, for example, handover statistics. For example, the helper cells may consist of the most common handover cells to/from the out of service cell. Black-listed neighboring cells (e.g., neighboring cells to which handover normally may not be permitted) may also be considered as helper cells.

As further shown in FIG. 4B, when base station 122-2 is out of service, first cell coverage area 410-1 (e.g., provided by base station 122-1) and/or third cell coverage area 410-3 (e.g., provided by base station 122-2) may constitute most favorable helper cells for user equipment 110-2 based on downlink evaluations and/or cell search procedures. Thus, base station 122-1 may extend first cell coverage area 410-1 to a first extended cell coverage area (EXTENDED CELL-1 COVERAGE) 440-1, and base station 122-3 may extend third cell coverage area 410-3 to a third extended cell coverage area (EXTENDED CELL-3 COVERAGE) 440-3 in order to serve user equipment 110-2. However, base station 122-1 and/or base station 122-3 may be unable to serve user equipment 110-2 (e.g., formerly served by base station 122-2) due to insufficient RACH coverage. For example, as shown in FIG. 4B, base station 122-1 may provide a first cell RACH coverage (CELL-1 RACH COVERAGE) 450-1 that fails to capture user equipment 110-2, and base station 122-3 may provide a third cell RACH coverage (CELL-3 RACH COVERAGE) 450-3 that fails to capture user equipment 110-2.

In one embodiment, base stations 122-1 and 122-3 may not change anything to create first extended cell coverage area 440-1 and third extended cell coverage area 440-3. Cell coverage areas 440-1 and 440-3 may be created based on how user equipment assisted handover and user equipment cell selection works, and because second cell coverage area 410-2 (e.g., provided by base station 122-1) disappeared.

Figure 4C:
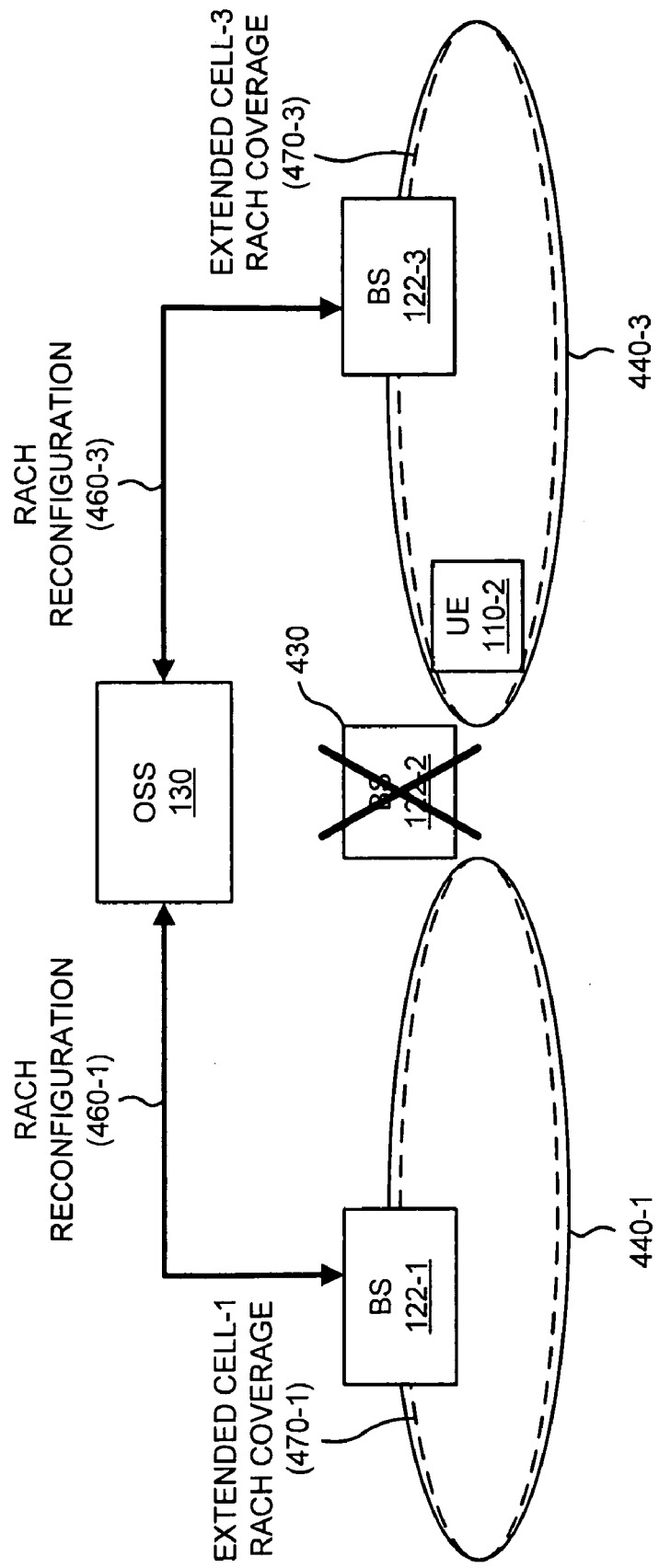

As shown in FIG. 4C, when it is determined that a cell (or base station 122-2) is out of service, a RACH parameters reconfiguration may be triggered for each of the helper cells (e.g., base stations 122-1 and/or 122-3). In one embodiment, as shown in FIG. 4C, a RACH parameters reconfiguration 460-1 may be triggered for base station 122-1 via OSS 130, and a RACH parameters reconfiguration 460-3 may be triggered for base station 122-3 via OSS 130. In other embodiments, RACH parameter reconfigurations 460-1 and 460-3 may be triggered by another component of network 100 (e.g., by base station 122-2, MME/S-GW 124, NMS 140, etc.). RACH parameter reconfigurations 460-1 and 460-3 may be triggered for contention-free preambles and/or for other preambles. Prior to implementing RACH parameter reconfigurations 460-1 and 460-3, base stations 122-1 and 122-3 may store their current RACH parameters configurations (e.g., also referred to herein as "baseline parameter configurations").

As further shown in FIG. 4C, RACH parameters reconfiguration 460-1 may cause base station 122-1 to extend first cell RACH coverage 450-1 to a first extended cell RACH coverage (EXTENDED CELL-1 RACH COVERAGE) 470-1 in order to serve user equipment 110-2. RACH parameters reconfiguration 460-3 may cause base station 122-3 to extend third cell RACH coverage 450-3 to a third extended cell RACH coverage (EXTENDED CELL-3 RACH COVERAGE) 470-3 in order to serve user equipment 110-2. With such an arrangement, base station 122-3 (e.g., via third extended cell coverage area 440-3 and third extended cell RACH coverage 470-3) may be able to serve user equipment 110-2 until base station 122-2 is able to provide service again. Although not shown in FIG. 4C, first extended cell coverage area 440-1 and first extended cell RACH coverage 470-1 may encompass user equipment 110-2 and may enable base station 122-1 to serve user equipment 110-2 until base station 122-2 is able to provide service again.

Figure 4D:
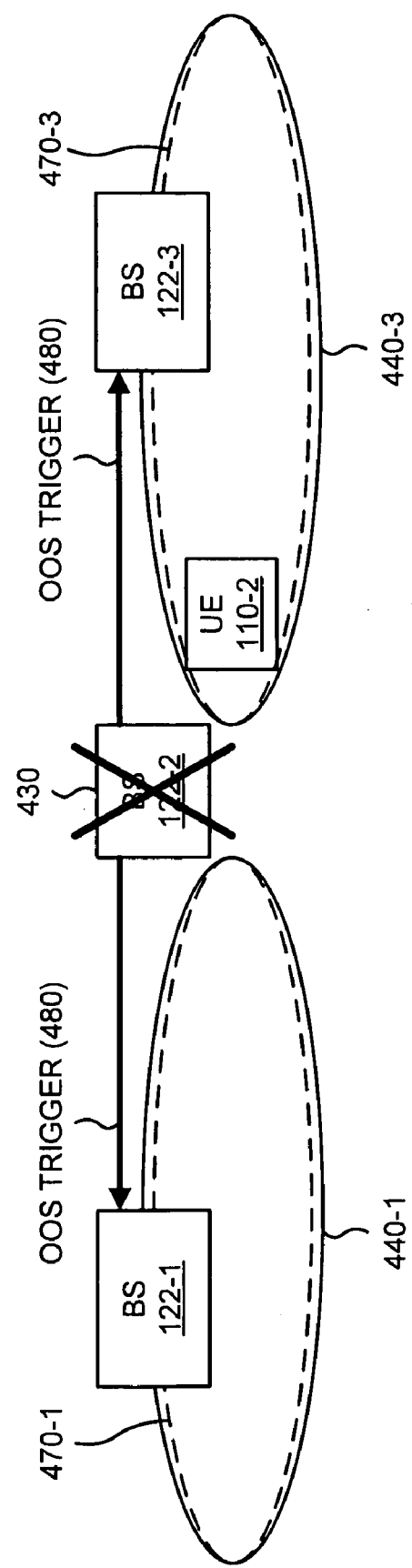

In another embodiment, as shown in FIG. 4D, when it is determined that a cell (or base station 122-2) is out of service, RACH parameter reconfigurations for base stations 122-1 and 122-3 may be triggered by the out of service base station 122-2 (e.g., via an out of service (OOS) trigger 480). As further shown in FIG. 4D, OOS trigger 480 may cause base station 122-1 to extend first cell RACH coverage 450-1 to first extended cell RACH coverage 470-1 in order to serve user equipment 110-2, and may cause base station 122-3 to extend third cell RACH coverage 450-3 to third extended cell RACH coverage 470-3 in order to serve user equipment 110-2. With such an arrangement, base station 122-3 (e.g., via third extended cell coverage area 440-3 and third extended cell RACH coverage 470-3) may be able to serve user equipment 110-2 until base station 122-2 is able to provide service again. Although not shown in FIG. 4D, first extended cell coverage area 440-1 and first extended cell RACH coverage 470-1 may encompass user equipment 110-2, and may enable base station 122-1 to serve user equipment 110-2 until base station 122-2 is able to provide service again.

In one embodiment, OOS trigger 480 may cause helper cells (e.g., base stations 122-1 and 122-3) to use a set of fallback, pre-configured RACH parameters when a neighboring cell (e.g., base station 122-2) goes out of service. In such a situation, the helper cells may ignore RACH parameters received from OSS 130. In another embodiment, OOS trigger 480 may cause helper cells (e.g., base stations 122-1 and 122-3) to contact OSS 130 for new RACH configuration parameters.

When the out of service cell (e.g., provided by base station 122-2) is determined (e.g., by OSS 130) to be able to provide service to user equipment 110-2 in its intended coverage area, the RACH parameters of the helper cells (e.g., base stations 122-1 and 122-3) may be reconfigured back to the baseline parameter configuration. In another embodiment, some of the RACH parameters of the helper cells may be reset to the baseline parameter configuration, while other RACH parameters may remain reconfigured and other automatic or autonomous mechanisms may gradually adjust the reconfigured RACH parameters. For example, RACH power control parameters may be gradually adjusted based on measurements associated with user equipment (e.g., user equipment 110-2). Such an arrangement may avoid inappropriate baseline parameter configurations, which may occur as a result of the cell being unintentionally out of service for some time before the loss of service was detected.

When the out of service cell (e.g., provided by base station 122-2) is able to provide service again, ongoing connections that eventually may be handed over to base station 122-2 may require some time for a handover procedure. In the meantime, such connections may need to perform random access using contention-free preambles with one of the helper cells (e.g., provided by base stations 122-1 and/or 122-3). In order to support a smooth handling of ongoing connections in the helper cells, reconfiguration of the contention-free preambles may be delayed to support connections until handovers to the out of service cell are completed. A smooth transition between the configurations for other types of preambles may also be provided.

Details about how base station 122-2 and/or OSS 130 trigger implement RACH parameters reconfigurations for base station 122-3 are described below in connection with, for example, FIGS. 5-10.

Although FIGS. 4A-4D show exemplary components of network portion 400, in other implementations, network portion 400 may contain fewer, different, differently arranged, or additional components than depicted in FIGS. 4A-4D. In still other implementations, one or more components of network portion 400 may perform one or more other tasks described as being performed by one or more other components of network portion 400.

FIG. 5 illustrates a diagram of exemplary RACH parameters reconfiguration signaling among components of an exemplary portion 500 of network 100. As illustrated, exemplary network portion 500 may include base stations 122-2 and 122-3, and OSS 130. Base stations 122-2 and 122-3 may include the features described above in connection with, for example, FIGS. 1 and 2. OSS 130 may include the features described above in connection with, for example, FIGS. 1 and 3.

As further shown in FIG. 5, it may be determined that base station 122-2 is an out of service cell 510 (e.g., because of a decision from some mechanism to prepare a cell or base station 122-2 for upgrades, when the need for service is low, such as during low traffic times and it is desirable to shut down network elements to save power, etc.). The determination may be made by the out of service base station (e.g., base station 122-2), a MME/S-GW (e.g., MME/S-GW 124) connected to the out of service base station, and/or another node of network 100 (e.g., OSS 130, NMS 140, etc.). When out of service cell 510 is determined to be unable to fulfill its tasks, a set of helper cells (e.g., a helper cell 520 associated with base station 122-3) in a vicinity of out of service cell 510 may be determined (e.g., by base station 122-2, MME/S-GW 124, OSS 130, NMS 140, etc.) based on, for example, handover statistics.

As further shown in FIG. 5, when out of service cell 510 is determined to be unable to fulfill its tasks, a RACH parameters reconfiguration may be triggered, as indicated by reference number 530, for each of the helper cells (e.g., base station 122-3). In one embodiment, RACH parameters reconfiguration triggering 530 may be implemented by OSS 130, and OSS 130 may provide RACH parameters reconfiguration 460-3 to base station 122-3. In other embodiments, RACH parameter reconfiguration triggering 530 may be implemented by out of service cell 510 (e.g., base station 122-2), and out of service cell 510 may provide OOS trigger 480 to base station 122-3.

Base station 122-3 may receive RACH parameters reconfiguration 460-3 from OSS 130, and may implement RACH parameters reconfiguration 460-3 (e.g., to extend third cell RACH coverage 450-3 to third extended cell RACH coverage 470-3 in order to serve user equipment 110-2). Alternatively and/or additionally, base station 122-3 may receive OOS trigger 480 from base station 122-2, and may implement a predetermined RACH parameters reconfiguration (e.g., to extend third cell RACH coverage 450-3 to third extended cell RACH coverage 470-3 in order to serve user equipment 110-

2). For example, in one embodiment, base station 122-3 may receive (e.g., via RACH parameters reconfiguration 460-3) information associated with a preamble reallocation 540, a preamble format selection 550, a RACH opportunity selection 560, and a RACH power control parameter reconfiguration 570. Further details of preamble reallocation 540, preamble format selection 550, RACH opportunity selection 560, and/or RACH power control parameter reconfiguration 570 are provided below in connection with, for example, FIGS. 7-10.

Although FIG. 5 shows exemplary components of network portion 500, in other implementations, network portion 500 may contain fewer, different, differently arranged, or additional components than depicted in FIG. 5. In still other implementations, one or more components of network portion 500 may perform one or more other tasks described as being performed by one or more other components of network portion 500.

Figure 6:
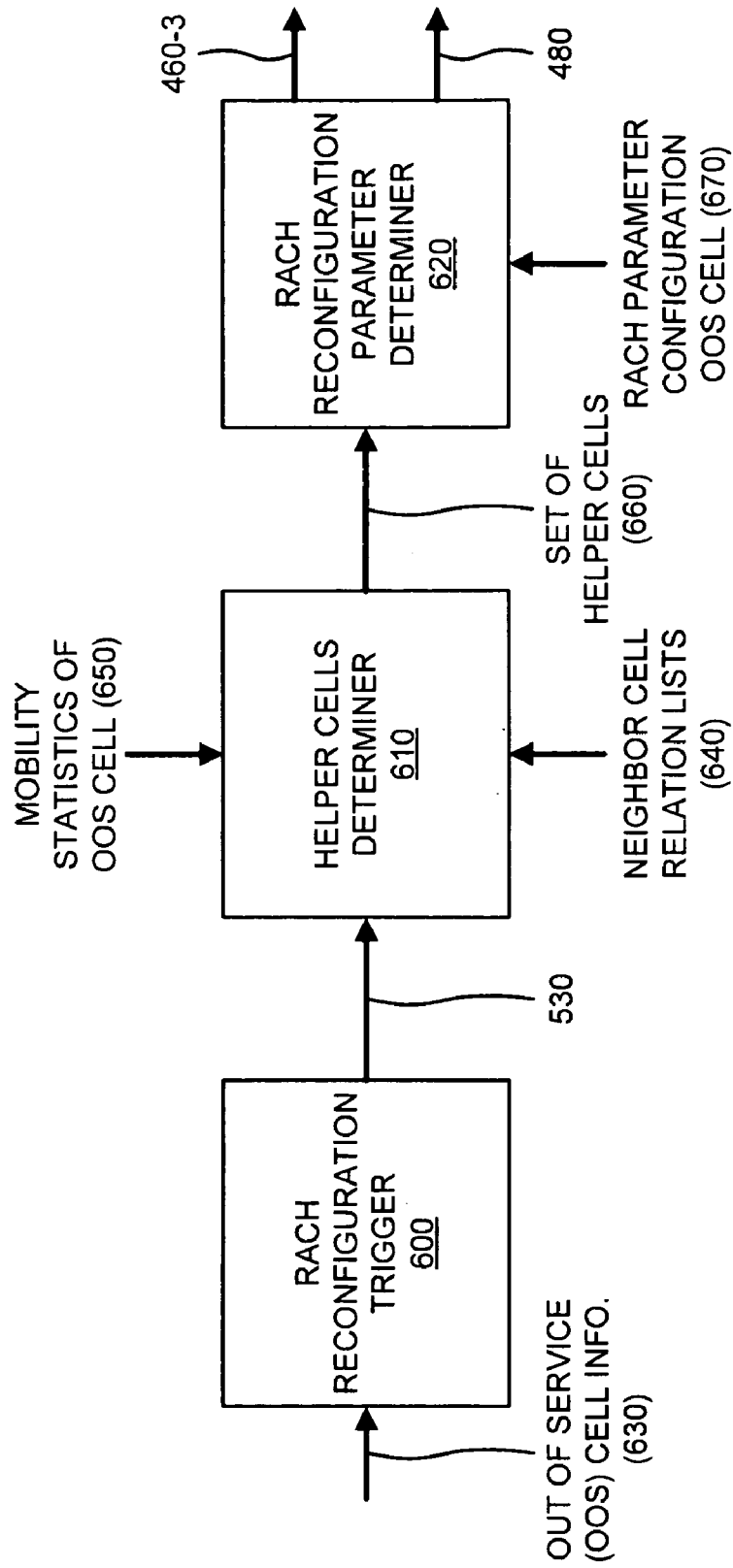
FIGS. 6-10 illustrates diagrams of exemplary functional components of a base station and/or the OSS depicted in FIG. 1.

FIGS. 6-10 depict diagrams of exemplary functional components of base station 122-2 and/or OSS 130. In one embodiment, the functions described in connection with FIGS. 6-10 may be performed by processing unit 232 (FIG. 2) and/or processing unit 320 (FIG. 3). As shown in FIG. 6, base station/OSS 122-2/130 may include a RACH reconfiguration trigger 600, a helper cells determiner 610, and a RACH reconfiguration parameter determiner 620.

RACH reconfiguration trigger 600 may include any hardware or combination of hardware and software that may receive out of service (OOS) cell information 630, and may generate RACH parameters reconfiguration triggering 530 based on OOS cell information 630. OOS cell information 630 may include information indicating that service for a cell (or cells) is unavailable due to, for example, malfunctioning equipment, a power outage, transport network failure, a decision from some mechanism (e.g., to prepare the cell or base station for upgrades, when the need for service is low, such as during low traffic times and it is desirable to shut down network elements to save power, etc.), etc. RACH reconfiguration trigger 600 may provide RACH parameters reconfiguration triggering 530 to helper cells determiner 610.

Helper cells determiner 610 may include any hardware or combination of hardware and software that may receive RACH parameters reconfiguration triggering 530, neighbor cell relation lists 640, and mobility statistics of OOS cell 650. Neighbor cell relation lists 640 may provide information associated with cells adjacent to an out of service cell. For example, referring back to FIG. 4C, neighbor cell relation lists 640 may include information associated with base stations 122-1/122-3 since base stations 122-1/122-3 are adjacent to the out of service base station 122-2. Mobility statistics of OOS cell 650 may include statistical information associated with an OOS cell 650 (e.g., base station 122-2). Helper cells determiner 610 may identify, based on RACH parameters reconfiguration triggering 530, neighbor cell relation lists 640, and mobility statistics of OOS cell 650, a set of helper cells 660 that need new RACH parameters configurations. For example, helper cells determiner 610 may identify base stations 122-1/122-3 as helper cells (e.g., that need new RACH parameters configurations) for an out of service cell (e.g., base station 122-2). Helper cells determiner 610 may provide set of helper cells 660 to RACH reconfiguration parameter determiner 620.

RACH reconfiguration parameter determiner 620 may include any hardware or combination of hardware and software that may receive set of helper cells 660 (e.g., from helper cells determiner 610) and a RACH parameter configuration 670 of the out of service cell. RACH parameter configuration 670 may include current RACH parameters associated with the out of service cell (e.g., base station 122-2). RACH reconfiguration parameter determiner 620 may determine RACH parameters reconfiguration 460-3 and/or OOS trigger 480 based on set of helper cells 660 and RACH parameter configuration 670. RACH reconfiguration parameter determiner 620 may provide RACH parameters reconfiguration 460-3 and/or OOS trigger 480 to helper cells (e.g., base stations 122-1/122-3) identified by set of helper cells 660.

Figure 7:
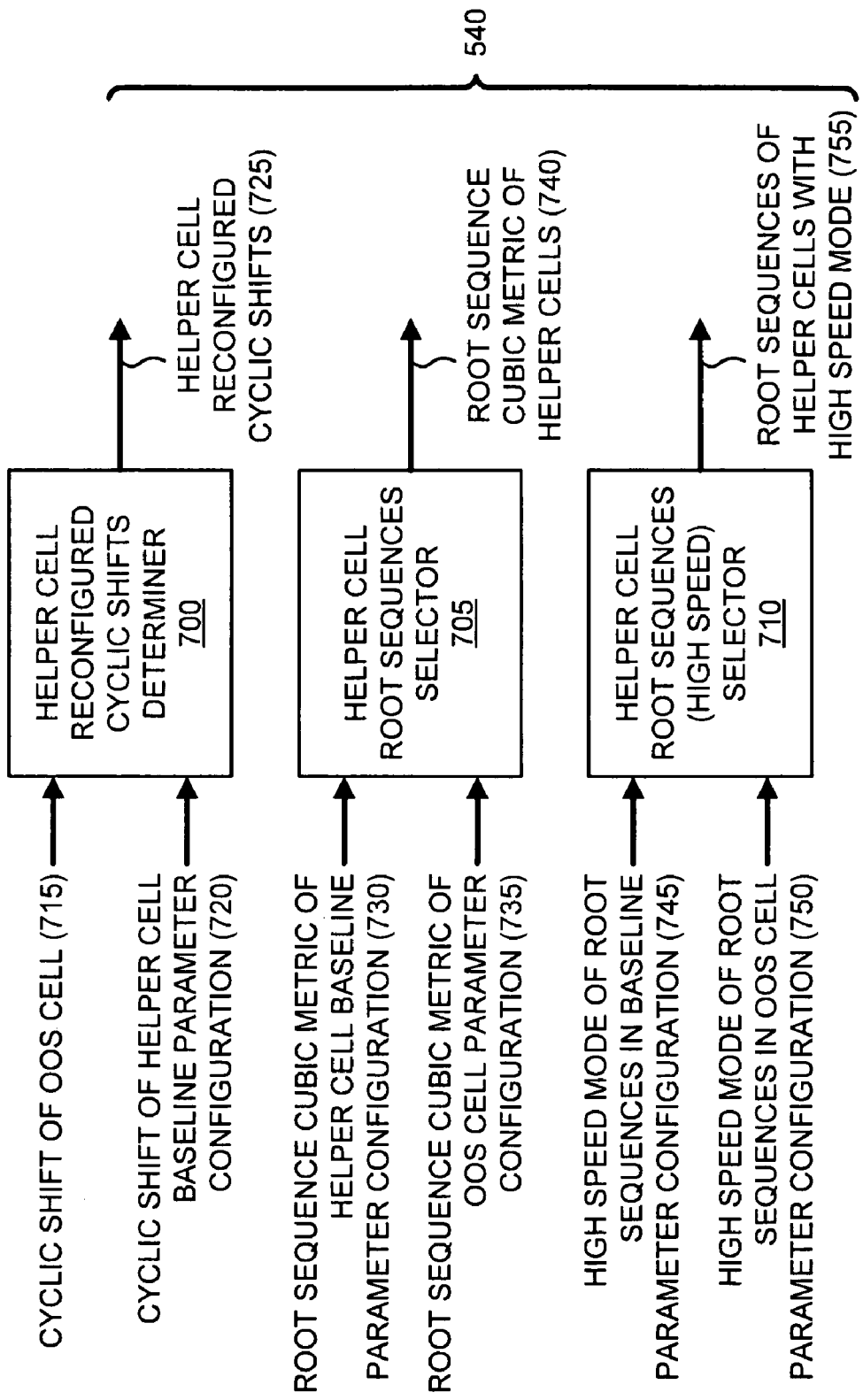

As shown in FIG. 7, base station 122-1/OSS 130 may include a helper cell reconfigured cyclic shifts determiner 700, a helper cell root sequences selector 705, and a helper cell root sequences (high speed) selector 710. Helper cell reconfigured cyclic shifts determiner 700, helper cell root sequences selector 705, and helper cell root sequences (high speed) selector 710 may generate information that may correspond to preamble reallocation 540 (FIG. 5).

Helper cell reconfigured cyclic shifts determiner 700 may include any hardware or combination of hardware and software that may receive a cyclic shift 715 of an out of service (OOS) cell and a cyclic shift 720 of a helper cell baseline parameter configuration. Helper cell reconfigured cyclic shifts determiner 700 may determine helper cell reconfigured cyclic shifts 725 based on cyclic shift 715 and cyclic shift 720. Since the helper cells may obtain extended coverage, cyclic shift 720 may lead to detection of preambles when users with a longer round trip time than cyclic shift 720 permits access to the helper cells. Therefore, helper cell reconfigured cyclic shifts 725 may include the expected round trip time for the extended coverage. In one embodiment, helper cell reconfigured cyclic shifts 725 may be a function of cyclic shift 715 of OOS cell and cyclic shift 720 of a helper cell baseline parameter configuration. For example, helper cell reconfigured cyclic shifts 725 may be a sum of cyclic shift 715 and cyclic shift 720. If several out of service cells are helped by a single helper cell, a maximum cyclic shift over the several out of service cells may be considered.

Helper cell root sequences selector 705 may include any hardware or combination of hardware and software that may receive a root sequence cubic metric 730 of a helper cell baseline parameter configuration and a root sequence cubic metric 735 of an out of service (OOS) cell parameter configuration. Helper cell root sequences selector 705 may select a root sequence cubic metric 740 of helper cells based on root sequence cubic metric 730 and root sequence cubic metric 735. In order to avoid jeopardizing RACH performance and coverage, the selection of root sequence cubic metric 740 may be a function of root sequence cubic metric 730 of a helper cell baseline parameter configuration and root sequence cubic metric 735 of OOS cell parameter configuration. For example, root sequence cubic metric 740 may be at least as low as root sequence cubic metric 730 of a helper cell baseline parameter configuration.

Helper cell root sequences (high speed) selector 710 may include any hardware or combination of hardware and software that may receive a high speed mode 745 of root sequences in a helper cell baseline parameter configuration and a high speed mode 750 of root sequences in an out of service (OOS) cell parameter configuration. Helper cell root sequences (high speed) selector 710 may select root sequences 755 of helper cells with a high speed mode based on high speed mode 745 and high speed mode 750. In one embodiment, root sequences 755 of helper cells with a high speed mode may be a function of high speed mode 745 of root sequences in a helper cell baseline parameter configuration and high speed mode 750 of root sequences in an OOS cell parameter configuration. For example, if the OOS cell (or OOS base station) is allocated high speed mode preambles, the helper cells may be reconfigured with high speed mode preambles provided that a reallocated cyclic shift allows any high speed mode. Conversely, if the helper cell baseline parameter configuration includes a high speed mode, the preamble reconfiguration of the helper cell may be restricted to enable a high speed mode.

The root sequence allocation (e.g., by helper cell root sequences selector 705 and helper cell root sequences (high speed) selector 710 may aim at allocating sequences to cells to avoid ambiguities in the random access procedure. For example, a neighbor cells relation list of a particular cell (A) may indicate which neighbor cells (e.g., $N_k$) that do not have the same root sequences as cell A. However, other neighbor cells (e.g., $N_i$ and $N_j$) may have the same root sequences unless they are neighbors to each other. When reconfiguring some helper cells, the allocation of root sequences may attempt to avoid ambiguities in the random access procedure. One alternative may be to ensure that none of the helper cells have the same root sequences. Another more conservative alternative may be to ensure that none of the helper cells have root sequences used by the neighbor cells to the out of service cell. In one embodiment, the root sequence allocation of the reconfigured helper cells may be based upon information about the root sequences used by other helper cells as well as the root sequences used by cells that are neighbors of the out of service cell. For example, root sequences allocated to the out of service cell may be used in the helper cells since these root sequences may not be used by the out of service cell.

As further shown in FIG. 7, helper cell reconfigured cyclic shifts 725, root sequence cubic metric 740, and root sequences 755 may correspond to preamble reallocation 540 (FIG. 5). Helper cell reconfigured cyclic shifts 725, root sequence cubic metric 740, and root sequences 755 (e.g., via preamble reallocation 540) may be provided to one or more helper cells (e.g., base station 122-3) via RACH parameters reconfiguration 460-3 and/or OOS trigger 480.

Figure 8:
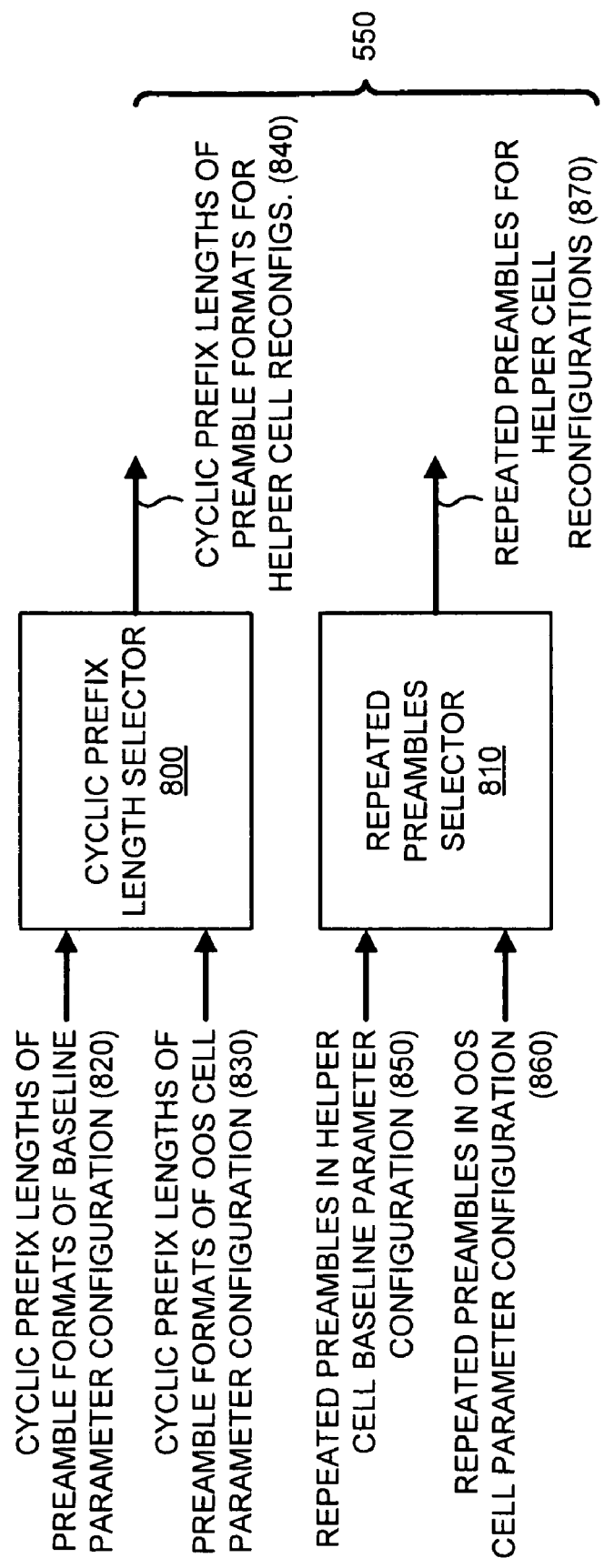

As shown in FIG. 8, base station 122-1/OSS 130 may include a cyclic prefix selector 800 and a repeated preambles selector 810. Cyclic prefix selector 800 and repeated preambles selector 810 may generate information that may correspond to preamble format selection 550 (FIG. 5).

Cyclic prefix selector 800 may include any hardware or combination of hardware and software that may receive cyclic prefix lengths 820 of preamble formats of a helper cell baseline parameter configuration and cyclic prefix lengths 820 of preamble formats of an out of service (OOS) cell parameter configuration. Cyclic prefix selector 800 may select cyclic prefix lengths 840 of preamble formats for helper cell reconfigurations based on cyclic prefix lengths 820 and cyclic prefix lengths 830. In one example, preamble format selection may include a long cyclic prefix and repeated preambles for helper cell reconfigurations. In another example, preamble format selection may include a long cyclic prefix for helper cell reconfigurations. In yet another example, long cyclic prefix lengths may be considered if the helper cell baseline parameter configuration uses a long cyclic prefix or if the out of service cell uses a long cyclic prefix.

Repeated preambles selector 810 may include any hardware or combination of hardware and software that may receive repeated preambles 850 in the helper cell baseline parameter configuration and repeated preambles 860 in the OOS cell parameter configuration. Repeated preambles selector 810 may select repeated preambles 870 for helper cell reconfigurations based on repeated preambles 850 and repeated preambles 860. In one example, repeated preambles may always be considered for helper cell parameter reconfigurations. In another example, repeated preambles may be considered if the helper cell baseline parameter configuration uses repeated preambles or if the out of service cell uses repeated preambles.

As further shown in FIG. 8, cyclic prefix lengths 840 of preamble formats for helper cell reconfigurations and repeated preambles 870 for helper cell reconfigurations may correspond to preamble format selection 550 (FIG. 5). Cyclic prefix lengths 840 and repeated preambles 870 (e.g., via preamble format selection 550) may be provided to one or more helper cells (e.g., base station 122-3) via RACH parameters reconfiguration 460-3 and/or OOS trigger 480.

Figure 9:
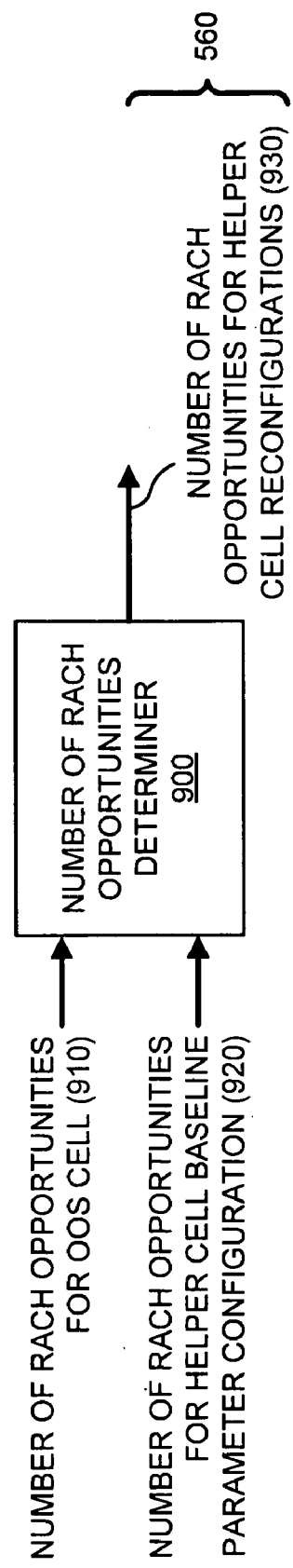

As shown in FIG. 9, base station 122-1/OSS 130 may include a number of RACH opportunities determiner 900. Number of RACH opportunities determiner 900 may generate information that may correspond to RACH opportunity selection 560 (FIG. 5).

Number of RACH opportunities determiner 900 may include any hardware or combination of hardware and software that may receive a number of RACH opportunities 910 for an out of service (OOS) cell and a number of RACH opportunities 920 for a helper cell baseline parameter configuration. Number of RACH opportunities determiner 900 may determine a number of RACH opportunities 930 for helper cell reconfigurations based on number of RACH opportunities 910 and number of RACH opportunities 920. Number of RACH opportunities 930 may reflect a RACH load. Since a helper cell may attract some of the traffic from a service area of an out of service cell, the RACH load (e.g., after helper cell reconfiguration) may increase. Number of RACH opportunities 930 after reconfiguration may therefore be a function of number of RACH opportunities 910 for an OOS cell and number of RACH opportunities 920 for a helper cell baseline parameter configuration. In one embodiment, assuming uniform traffic and that the helper cells evenly share the traffic of the out of service cell, number of RACH opportunities 930 after reconfiguration may be a function of the sum of number of RACH opportunities 910 and number of RACH opportunities 920 divided by the number of helper cells. If estimates of the RACH load in the out of service cell and the helper cells are available, number of RACH opportunities 930 may be based upon a function of RACH load estimates in the out of service cell and the helper cells.

As further shown in FIG. 9, number of RACH opportunities 930 for helper cell reconfigurations may correspond to RACH opportunity selection 560 (FIG. 5). Number of RACH opportunities 930 (e.g., via RACH opportunity selection 560) may be provided to one or more helper cells (e.g., base station 122-3) via RACH parameters reconfiguration 460-3 and/or OOS trigger 480.

Figure 10:
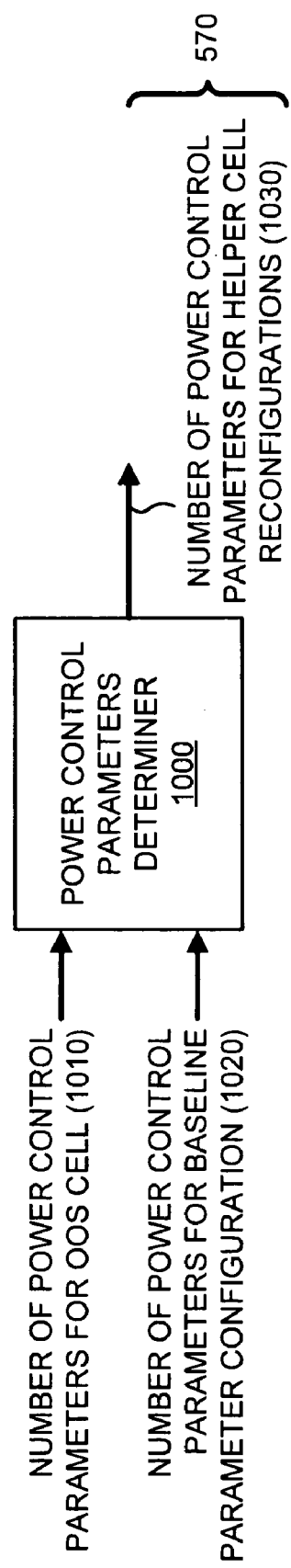

As shown in FIG. 10, base station 122-1/OSS 130 may include a power control parameters determiner 1000. Power control parameters determiner 1000 may generate information that may correspond to RACH power control parameter reconfiguration 570 (FIG. 5).

Power control parameters determiner 1000 may include any hardware or combination of hardware and software that may receive a number of power control parameters 1010 for an out of service (OOS) cell and a number of power control parameters 1020 for a helper cell baseline parameter configuration. Power control parameters determiner 1000 may determine a number of power control parameters 1030 for helper cell reconfigurations based on number of power control parameters 1010 and number of power control parameters 1020.

Power control parameters may reflect uncertainty in path loss estimation and in an uplink interference level, but may relate to a selected preamble format and a number of RACH opportunities. The path loss estimation accuracy may remain the same for extended cell coverage. However, reciprocity of a channel may change (e.g., the path loss may be estimated in the downlink, while it may be used for random access power level calculations for the uplink). Therefore, a higher power control step ($\Delta_{RACH}$) than in a helper cell baseline parameter configuration may be needed. A parameter ($P_{O\_RACH}$) may be related to a receiver situation at the helper cell, and may be unchanged for extended cell coverage. A perceived interference level may decrease because interference contribution from the out of service cell may be missing. Therefore, $P_{O\_RACH}$ may be adjusted downwards, and $\Delta_{preamble}$ may be defined based on the selected preamble format. A maximum number of retransmissions ($N_{MAX}$) may be determined as a function of the $N_{MAX}$ of the out of service cell and the helper cells. For example, the maximum number of retransmissions ($N_{MAX}$) may be a maximum of the $N_{MAX}$ of the out of service cell and the helper cells (e.g., possibly with a positive offset).

As further shown in FIG. 10, number of power control parameters 1030 for helper cell reconfigurations may correspond to RACH power control parameter reconfiguration 570 (FIG. 5). Number of power control parameters 1030 (e.g., via RACH power control parameter reconfiguration 570) may be provided to one or more helper cells (e.g., base station 122-3) via RACH parameters reconfiguration 460-3 and/or OOS trigger 480.

The functions described above in connection with FIGS. 6-10 may be applied as a centralized solution or as a decentralized solution. In the centralized solution, a central node of network 100 (e.g., OSS 130, NMS 140, etc.) may manage knowledge about RACH parameter configurations in the cells of network 100 (e.g., as well as neighbor cell relation lists), and upon detection of an out of service cell, may determine a set of helper cells and a helper cell RACH parameters reconfiguration. In the decentralized solution, an out of service cell may determine the set of helper cells, and may signal its current RACH parameter configuration to the helper cells. The helper cells may calculate suitable RACH parameters reconfigurations and may request new root sequences (e.g., from OSS 130).

Furthermore, the helper cell RACH parameters reconfigurations may be pre-determined or determined when the helper cell RACH parameters reconfigurations have been triggered. In one embodiment, a number of RACH parameters reconfigurations may be pre-determined and may correspond to an extended coverage applicable for most cell relations. Corresponding root sequences may be reserved for this purpose. The pre-determined RACH parameters configurations for extended coverage may be administered by a central node of network 100 (e.g., OSS 130, NMS 140, etc.) and may be assigned to helper cells by the central node after detecting the out of service cell or in response to a request for a RACH parameters reconfiguration from a helper cell. The pre-determined RACH parameters configurations may be reconsidered when the RACH parameters configurations of the cells are altered over time. In another embodiment, some RACH parameters may be pre-determined, and other RACH parameters may be determined upon detection of the out of service cell. For example, root sequences may be pre-determined, while the other RACH parameters may be reconfigured upon out of service cell detection.

Although FIGS. 6-10 show exemplary functional components of base station 122-1/OSS 130, in other implementations, base station 122-1/OSS 130 may contain fewer, different, differently arranged, or additional functional components than depicted in FIGS. 6-10. In still other implementations, one or more functional components of base station 122-1/OSS 130 may perform one or more other tasks described as being performed by one or more other functional components of base station 122-1/OSS 130.

Figure 11:
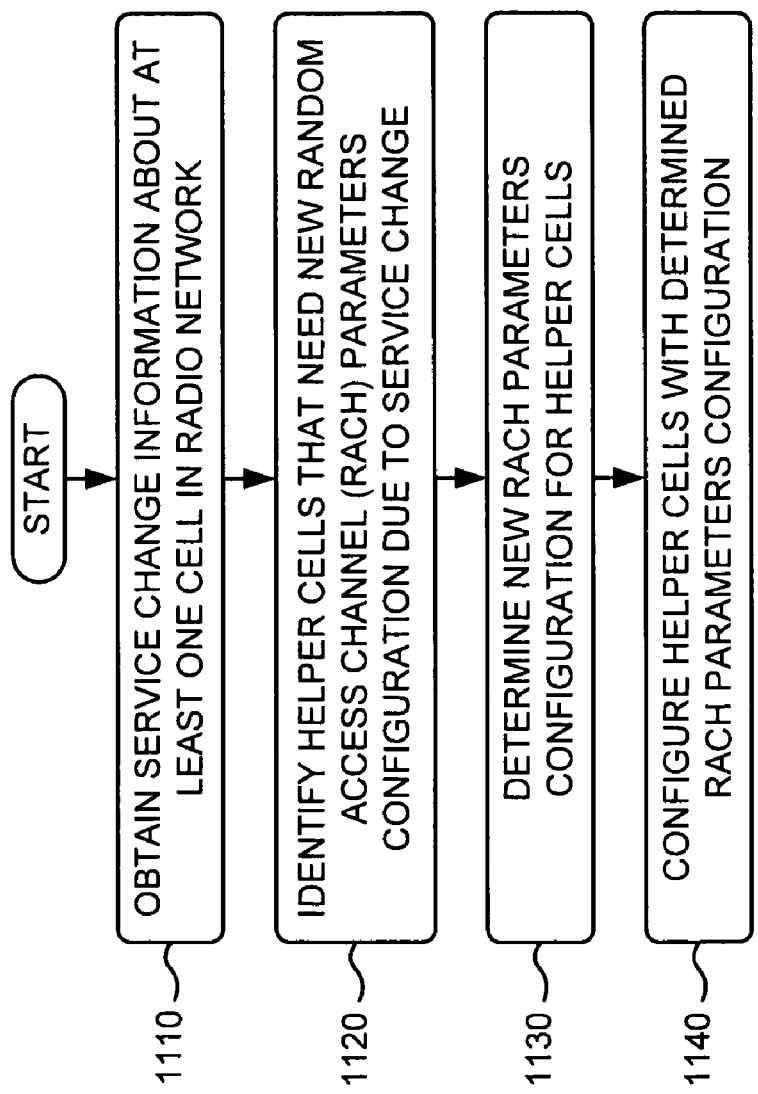
FIG. 11 depicts a flow chart of an exemplary process for triggering a RACH parameters reconfiguration according to embodiments described herein.

FIG. 11 illustrates a flow chart of an exemplary process 1100 for triggering a RACH parameters reconfiguration according to embodiments described herein. In one embodiment, process 1100 may be performed by an out or service base station (e.g., base station 122-2), MME/S-GW 124, OSS 130, and/or NMS 140. In other embodiments, some or all of process 1100 may be performed by another device or group of devices (e.g., communicating with base station 122-2, MME/S-GW 124, OSS 130, and/or NMS 140).

As illustrated in FIG. 11, process 1100 may begin with obtaining service change information about at least one cell in a radio network (block 1110), and identifying helper cells that need a new random access channel (RACH) parameters configuration due to the service change (block 1120). For example, in embodiments described above in connection with FIG. 4B, if base station 122-2 is out of service (e.g., because of a decision from some mechanism, such as to prepare a cell or base station 122-2 for upgrades, when the need for service is low, such as during low traffic times and it is desirable to shut down network elements to save power, etc.), as indicated by reference number 430, base station 122-2 may be unable to serve user equipment 110-2 in second cell coverage area 410-2. It may be determined that an out of service cell or an out of service base station (e.g., base station 122-2) is unable to serve user equipment (e.g., user equipment 110-2) in its intended coverage area. The determination may be made by the out of service base station (e.g., base station 122-2), a MME/S-GW (e.g., MME/S-GW 124) connected to the out of service base station, and/or another node of network 100 (e.g., OSS 130, NMS 140, etc.). When an out of service cell (e.g., base station 122-2) is determined to be unable to fulfill its tasks, a set of alternative (or "helper") cells in the vicinity of the out of service cell may be determined (e.g., by base station 122-2, MME/S-GW 124, OSS 130, NMS 140, etc.) based on, for example, handover statistics.

As further shown in FIG. 11, a new RACH parameters configuration may be determined for the helper cells (block 1130), and the helper cells may be configured with the determined RACH parameters configuration (block 1140). For example, in embodiments described above in connection with FIG. 4C, when it is determined that a cell (or base station 122-2) is out of service, a RACH parameters reconfiguration may be triggered for each of the helper cells (e.g., base stations 122-1 and/or 122-3). In one example, RACH parameters reconfiguration 460-1 may be triggered for base station 122-1 via OSS 130, and RACH parameters reconfiguration 460-3 may be triggered for base station 122-3 via OSS 130. In other examples, RACH parameter reconfigurations 460-1 and 460-3 may be triggered by another component of network 100 (e.g., by base station 122-2, MME/S-GW 124, NMS 140, etc.). RACH parameters reconfiguration 460-1 may cause base station 122-1 to extend first cell RACH coverage 450-1 to first extended cell RACH coverage (EXTENDED CELL-1 RACH COVERAGE) 470-1 in order to serve user equipment 110-2. RACH parameters reconfiguration 460-3 may cause base station 122-3 to extend third cell RACH coverage 450-3 to third extended cell RACH coverage (EXTENDED CELL-3 RACH COVERAGE) 470-3 in order to serve user equipment 110-2.

FIGS. 12-17 depict flow charts of an exemplary process 1200 for reconfiguring RACH parameters according to embodiments described herein. In one embodiment, process 1200 may be performed by an out or service base station (e.g., base station 122-2), MME/S-GW 124, OSS 130, and/or NMS 140. In other embodiments, some or all of process 1200 may be performed by another device or group of devices (e.g., communicating with base station 122-2, MME/S-GW 124, OSS 130, and/or NMS 140).

Figure 12:
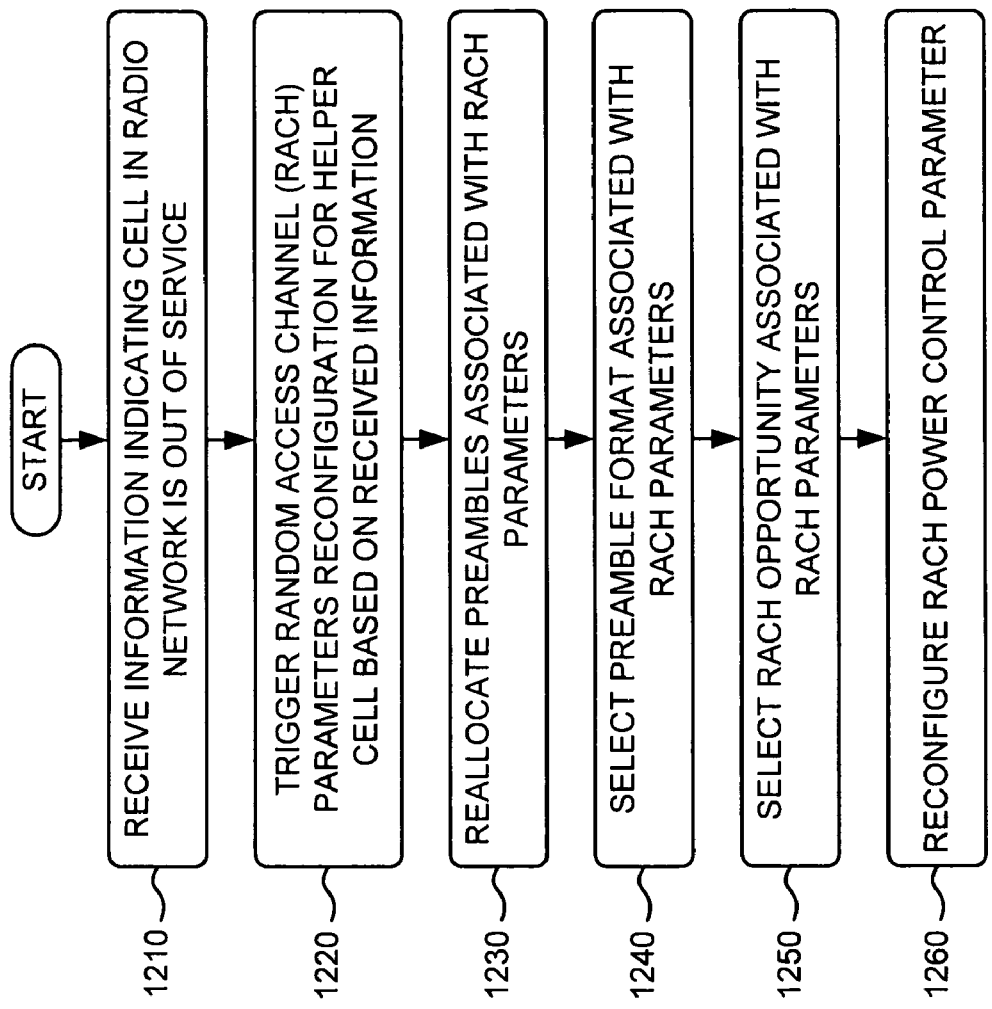
FIGS. 12-17 illustrate flow charts of an exemplary process for reconfiguring RACH parameters according to embodiments described herein.

As illustrated in FIG. 12, process 1200 may begin with receipt of information indicating that a cell in a radio network is out of service (block 1210), and triggering a random access channel (RACH) parameters reconfiguration for a helper cell based on the received information (block 1220). For example, in embodiments described above in connection with FIG. 5, it may be determined that base station 122-2 is out of service cell 510 (e.g., because of a decision from some mechanism to prepare a cell or base station 122-2 for upgrades, when the need for service is low, such as during low traffic times and it is desirable to shut down network elements to save power, etc.). The determination may be made by the out of service base station (e.g., base station 122-2), a MME/S-GW (e.g., MME/S-GW 124) connected to the out of service base station, and/or another node of network 100 (e.g., OSS 130, NMS 140, etc.). When out of service cell 510 is determined to be unable to fulfill its tasks, a set of helper cells (e.g., a helper cell 520 associated with base station 122-3) in a vicinity of out of service cell 510 may be determined (e.g., by base station 122-2, MME/S-GW 124, OSS 130, NMS 140, etc.) based on, for example, handover statistics. When out of service cell 510 is determined to be unable to fulfill its tasks, a RACH parameters reconfiguration may be triggered, as indicated by reference number 530, for each of the helper cells (e.g., base station 122-3). In one example, RACH parameters reconfiguration triggering 530 may be implemented by OSS 130, and OSS 130 may provide RACH parameters reconfiguration 460-3 to base station 122-3.

As further shown in FIG. 12, preambles associated with the RACH parameters may be reallocated (block 1230), a preamble format associated with the RACH parameters may be selected (block 1240), a RACH opportunity associated with the RACH parameters may be selected (block 1250), and a RACH power control parameter may be reconfigured (block 1260). For example, in embodiments described above in connection with FIG. 5, base station 122-3 may receive RACH parameters reconfiguration 460-3 from OSS 130, and may implement RACH parameters reconfiguration 460-3 (e.g., to extend third cell RACH coverage 450-3 to third extended cell RACH coverage 470-3 in order to serve user equipment 110-2). Alternatively and/or additionally, base station 122-3 may receive OOS trigger 480 from base station 122-2, and may implement a predetermined RACH parameters reconfiguration (e.g., to extend third cell RACH coverage 450-3 to third extended cell RACH coverage 470-3 in order to serve user equipment 110-2). In one example, base station 122-3 may receive (e.g., via RACH parameters reconfiguration 460-3) information associated with preamble reallocation 540, preamble format selection 550, RACH opportunity selection 560, and/or RACH power control parameter reconfiguration 570.

Figure 13:
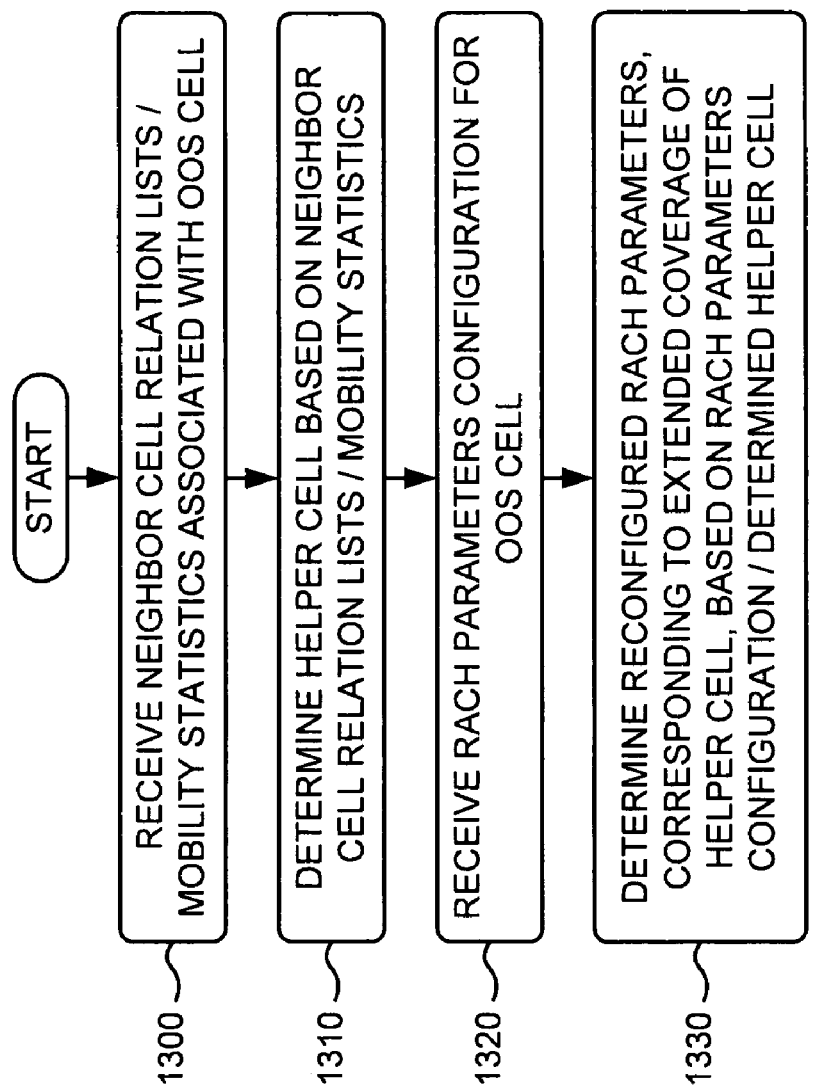

Process block 1220 may include the process blocks depicted in FIG. 13. As illustrated in FIG. 13, process block 1220 may include receiving neighbor cell relation lists and/or mobility statistics associated with an out of service (OOS) cell (block 1300), and determining the helper cell based on the neighbor cell relation lists and/or mobility statistics (block 1310). For example, in embodiments described above in connection with FIG. 6, helper cells determiner 610 of base station/OSS 122-3/130 may receive RACH parameters reconfiguration triggering 530, neighbor cell relation lists 640, and mobility statistics of OOS cell 650. Neighbor cell relation lists 640 may provide information associated with cells adjacent to an out of service cell. Mobility statistics of OOS cell 650 may include statistical information associated with an OOS cell 650 (e.g., base station 122-2). Helper cells determiner 610 may identify, based on RACH parameters reconfiguration triggering 530, neighbor cell relation lists 640, and mobility statistics of OOS cell 650, a set of helper cells 660 that need new RACH parameters configurations. In one example, helper cells determiner 610 may identify base stations 122-1/122-3 as helper cells (e.g., that need new RACH parameters configurations) for an out of service cell (e.g., base station 122-2).

As further shown in FIG. 13, process block 1220 may include receiving a RACH parameters configuration for the out of service cell (block 1320), and determining reconfigured RACH parameters, corresponding to extended coverage of the helper cell, based on the RACH parameters configuration and the determined helper cell (block 1330). For example, in embodiments described above in connection with FIG. 6, RACH reconfiguration parameter determiner 620 of base station/OSS 122-3/130 may receive set of helper cells 660 and RACH parameter configuration 670 of the out of service cell. RACH parameter configuration 670 may include current RACH parameters associated with the out of service cell (e.g., base station 122-2). RACH reconfiguration parameter determiner 620 may determine RACH parameters reconfiguration 460-3 and/or OOS trigger 480 based on set of helper cells 660 and RACH parameter configuration 670. RACH reconfiguration parameter determiner 620 may provide RACH parameters reconfiguration 460-3 and/or OOS trigger 480 to helper cells (e.g., base stations 122-1/122-3) identified by set of helper cells 660.

Figure 14:
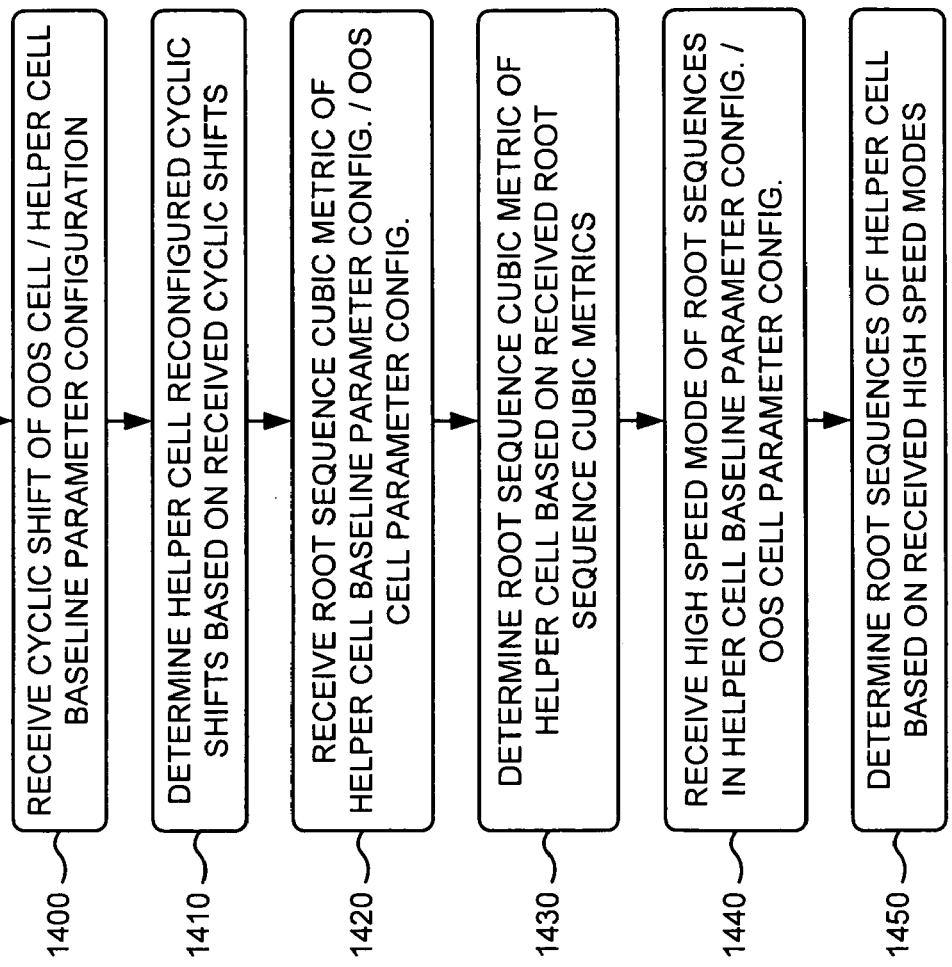

Process block 1230 may include the process blocks depicted in FIG. 14. As illustrated in FIG. 14, process block 1230 may include receiving a cyclic shift of the out of service (OOS) cell and a cyclic shift of a helper cell baseline parameter configuration (block 1400), and determining helper cell reconfigured cyclic shifts based on the received cyclic shifts (block 1410). For example, in embodiments described above in connection with FIG. 7, helper cell reconfigured cyclic shifts determiner 700 of base station/OSS 122-3/130 may receive cyclic shift 715 of an out of service (OOS) cell and cyclic shift 720 of a helper cell baseline parameter configuration. Helper cell reconfigured cyclic shifts determiner 700 may determine helper cell reconfigured cyclic shifts 725 based on cyclic shift 715 and cyclic shift 720. In one example, helper cell reconfigured cyclic shifts 725 may be a sum of cyclic shift 715 and cyclic shift 720.

As further shown in FIG. 14, process block 1230 may include receiving a root sequence cubic metric of the helper cell baseline parameter configuration and a root sequence cubic metric of an OOS cell parameter configuration (block 1420), and determining a root sequence cubic metric of the helper cell based on the received root sequence cubic metrics (block 1430). For example, in embodiments described above in connection with FIG. 7, helper cell root sequences selector 705 of base station/OSS 122-3/130 may receive root sequence cubic metric 730 of a helper cell baseline parameter configuration and root sequence cubic metric 735 of an out of service (OOS) cell parameter configuration. Helper cell root sequences selector 705 may select root sequence cubic metric 740 of helper cells based on root sequence cubic metric 730 and root sequence cubic metric 735. The selection of root sequence cubic metric 740 may be a function of root sequence cubic metric 730 of a helper cell baseline parameter configuration and root sequence cubic metric 735 of OOS cell parameter configuration. In one example, root sequence cubic metric 740 may be at least as low as root sequence cubic metric 730 of a helper cell baseline parameter configuration.

Returning to FIG. 14, process block 1230 may include receiving a high speed mode of root sequences in the helper cell baseline parameter configuration and a high speed mode of the OOS cell parameter configuration (block 1440), and determining root sequences of the helper cell based on the received high speed mode (block 1450). For example, in embodiments described above in connection with FIG. 7, helper cell root sequences (high speed) selector 710 of base station/OSS 122-3/130 may receive high speed mode 745 of root sequences in a helper cell baseline parameter configuration and high speed mode 750 of root sequences in an out of service (OOS) cell parameter configuration. Helper cell root sequences (high speed) selector 710 may select root sequences 755 of helper cells with a high speed mode based on high speed mode 745 and high speed mode 750. In one example, root sequences 755 of helper cells with a high speed mode may be a function of high speed mode 745 of root sequences in a helper cell baseline parameter configuration and high speed mode 750 of root sequences in an OOS cell parameter configuration.

Figure 15:
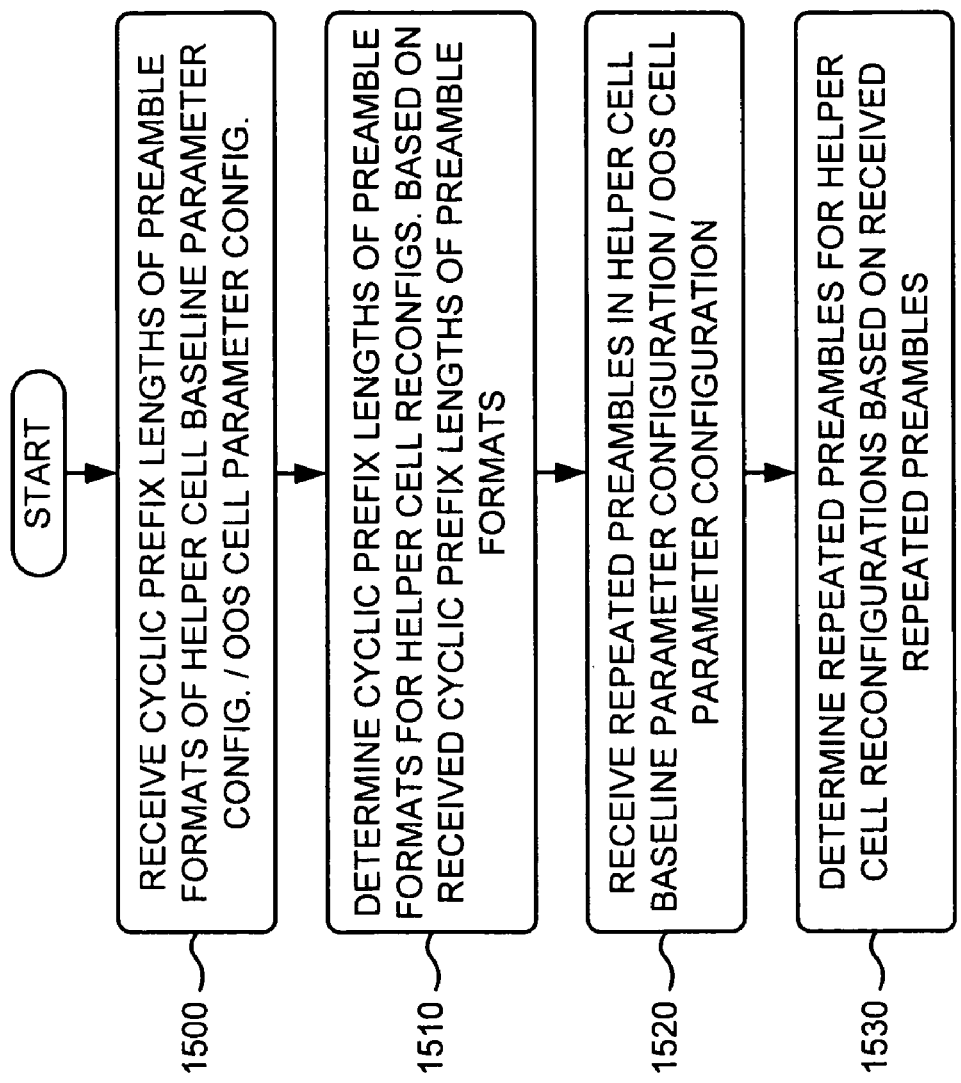

Process block 1240 may include the process blocks depicted in FIG. 15. As illustrated in FIG. 15, process block 1240 may include receiving cyclic prefix lengths of preamble formats of a helper cell baseline parameter configuration and cyclic prefix lengths of preamble formats of an OOS cell parameter configuration (block 1500), and determining cyclic prefix lengths of preamble formats for helper cell reconfigurations based on the received cyclic prefix lengths of preamble formats (block 1510). For example, in embodiments described above in connection with FIG. 8, cyclic prefix selector 800 of base station/OSS 122-3/130 may receive cyclic prefix lengths 820 of preamble formats of a helper cell baseline parameter configuration and cyclic prefix lengths 830 of preamble formats of an out of service (OOS) cell parameter configuration. Cyclic prefix selector 800 may select cyclic prefix lengths 840 of preamble formats for helper cell reconfigurations based on cyclic prefix lengths 820 and cyclic prefix lengths 830. In one example, preamble format selection may include a long cyclic prefix and repeated preambles for helper cell reconfigurations. In another example, preamble format selection may include a long cyclic prefix for helper cell reconfigurations.

As further shown in FIG. 15, process block 1240 may include receiving repeated preambles in the helper cell baseline parameter configuration and repeated preambles in the OOS cell parameter configuration (block 1520), and determining repeated preambles for the helper cell reconfigurations based on the received repeated preambles (block 1530). For example, in embodiments described above in connection with FIG. 8, repeated preambles selector 810 of base station/OSS 122-3/130 may receive repeated preambles 850 in the helper cell baseline parameter configuration and repeated preambles 860 in the OOS cell parameter configuration. Repeated preambles selector 810 may select repeated preambles 870 for helper cell reconfigurations based on repeated preambles 850 and repeated preambles 860. In one example, repeated preambles may always be considered for helper cell parameter reconfigurations. In another example, repeated preambles may be considered if the helper cell baseline parameter configuration uses repeated preambles or if the out of service cell uses repeated preambles.

Figure 16:
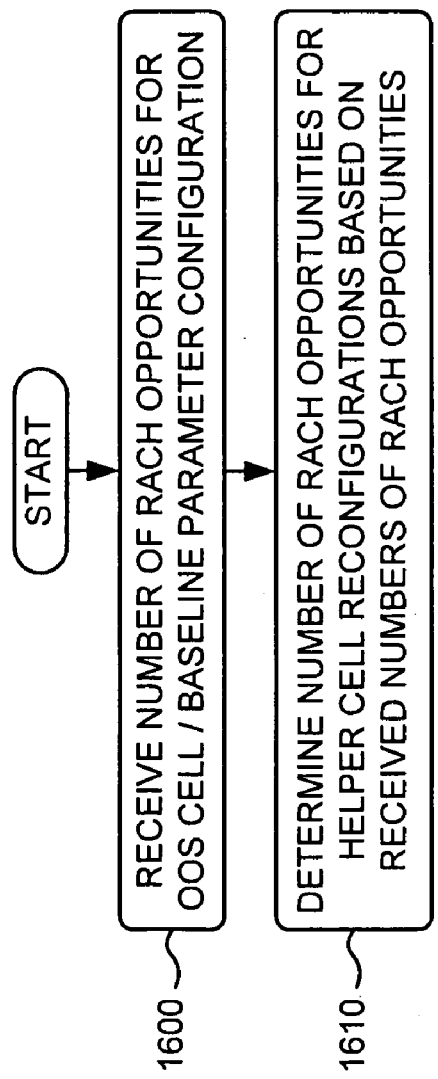

Process block 1250 may include the process blocks depicted in FIG. 16. As illustrated in FIG. 16, process block 1250 may include receiving a number of RACH opportunities for the OOS cell and a number of RACH opportunities for the helper cell baseline parameter configuration (block 1600), and determining a number of RACH opportunities for helper cell reconfigurations based on the received numbers of RACH opportunities (block 1610). For example, in embodiments described above in connection with FIG. 9, number of RACH opportunities determiner 900 of base station/OSS 122-3/130 may receive number of RACH opportunities 910 for an out of service (OOS) cell and number of RACH opportunities 920 for a helper cell baseline parameter configuration. Number of RACH opportunities determiner 900 may determine number of RACH opportunities 930 for helper cell reconfigurations based on number of RACH opportunities 910 and number of RACH opportunities 920. Number of RACH opportunities 930 after reconfiguration may be a function of number of RACH opportunities 910 for an OOS cell and number of RACH opportunities 920 for a helper cell baseline parameter configuration. In one example, number of RACH opportunities 930 after reconfiguration may be a function of the sum of number of RACH opportunities 910 and number of RACH opportunities 920 divided by the number of helper cells.

Figure 17:
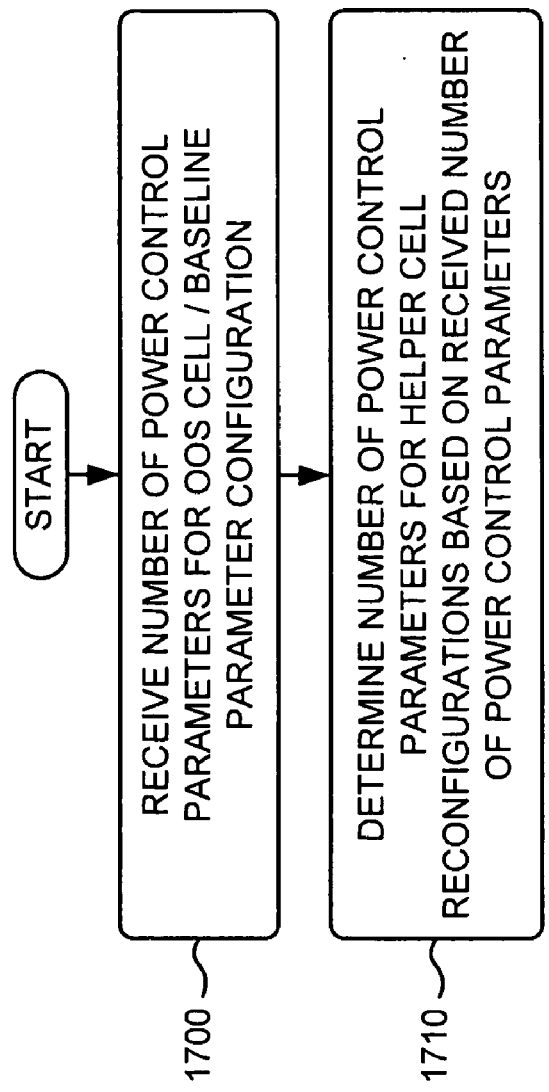

Process block 1260 may include the process blocks depicted in FIG. 17. As illustrated in FIG. 17, process block 1260 may include receiving a number of power control parameters for the OOS cell and a number of power control parameters for the helper cell baseline parameter configuration (block 1700), and determining a number of power control parameters for helper cell reconfigurations based on the received numbers of power control parameters (block 1710). For example, in embodiments described above in connection with FIG. 10, power control parameters determiner 1000 of base station/OSS 122-3/130 may receive number of power control parameters 1010 for an out of service (OOS) cell and number of power control parameters 1020 for a helper cell baseline parameter configuration. Power control parameters determiner 1000 may determine number of power control parameters 1030 for helper cell reconfigurations based on number of power control parameters 1010 and number of power control parameters 1020.

Embodiments described herein may provide systems and/or methods that provide a random access channel (RACH) reconfiguration for temporarily extending cell coverage. The RACH reconfiguration may include RACH parameter reconfiguration triggering that may be implemented based on service change information (e.g., out of service) about a cell in a radio network. Alternatively and/or additionally, the RACH reconfiguration may include one or more of preamble reallocation, preamble format selection, RACH opportunity selection, and/or RACH power control parameter reconfiguration. The systems and/or methods may support the random access procedure in self-healing cases when some cells extend coverage in order to attract traffic from a service area of a malfunctioning cell or base station. The systems and/or methods may support the random access procedure when cells are disabled (e.g., out of service) during low traffic times, particular days of the week, etc., when cells are disabled for maintenance, and/or when other cells are reconfigured in order to receive traffic from the disabled cells.

The foregoing description of embodiments provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 11-17, the order of the blocks may be modified in other embodiments. Further, non-dependent blocks may be performed in parallel.

It should be emphasized that the term "comprises/comprising" when used in this specification is taken to specify the presence of stated features, integers, steps or components but does not preclude the presence or addition of one or more other features, integers, steps, components or groups thereof.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method in a radio network that includes a device, the method comprising:
    obtaining, via the device, a service change associated with a cell in the radio network;
    identifying, via the device, helper cells in the radio network that need new random access channel (RACH) parameters due to the service change;
    determining, via the device, a RACH parameters configuration for the helper cells;
    configuring, via the device, the helper cells with the determined RACH parameters configuration;
    receiving information indicating that the cell in the radio network is out of service; and
    triggering a RACH parameters reconfiguration for a particular helper cell based on the received information, where the triggering of a RACH parameters reconfiguration comprises:
        receiving neighbor cell relation lists associated with cells adjacent to the out of service cell;
        receiving mobility statistics associated with the out of service cell;
        determining the particular helper cell based on the neighbor cell relation lists and the mobility statistics;
        receiving a RACH parameters configuration for the out of service cell; and
        determining reconfigured RACH parameters, corresponding to extended coverage of the particular helper cell, based on the RACH parameters configuration and the determined helper cell.

2. The method of claim 1, where the device is an operation and support system (OSS) node.

3. A method in a radio network that includes a device, the method comprising:
    obtaining, via the device, a service change associated with a cell in the radio Network;
    identifying, via the device, helper cells in the radio network that need new random access channel (RACH) parameters due to the service change;
    determining, via the device, a RACH parameters configuration for the helper cells;
    configuring, via the device, the helper cells with the determined RACH parameters configuration;
    reallocating a preamble associated with the RACH parameters reconfiguration;
    selecting a preamble format associated with the RACH parameters reconfiguration;
    selecting a RACH opportunity associated with the RACH parameters reconfiguration; and
    reconfiguring a RACH power control parameter associated with the RACH parameters reconfiguration.

4. The method of claim 3, where reallocating a preamble comprises:
    receiving a cyclic shift associated with the out of service cell;
    receiving a cyclic shift associated with a helper cell baseline parameter configuration;
    determining a reconfigured cyclic shift for the particular helper cell based on the received cyclic shifts;
    receiving a root sequence cubic metric associated with the helper cell baseline parameter configuration;
    receiving a root sequence cubic metric associated with an out of service cell parameter configuration;
    determining a root sequence cubic metric for the particular helper cell based on the received root sequence cubic metrics;
    receiving a high speed mode of root sequences in the helper cell baseline parameter configuration;
    receiving a high speed mode of root sequences in the out of service cell parameter configuration; and
    determining a root sequence for the particular helper cell based on the received high speed modes.

5. The method of claim 3, where selecting a preamble format comprises:
    receiving a cyclic prefix length of a preamble format associated with a helper cell baseline parameter configuration;
    receiving a cyclic prefix length of a preamble format associated with an out of service cell parameter configuration;
    determining a cyclic prefix length of the preamble format for the particular helper cell based on the received cyclic prefix lengths;
    receiving a repeated preamble associated with the helper cell baseline parameter configuration;
    receiving a repeated preamble associated with the out of service cell parameter configuration; and
    determining a repeated preamble for the particular helper cell based on the received repeated preambles.

6. The method of claim 3, where selecting a RACH opportunity comprises:
    receiving a number of RACH opportunities associated with the out of service cell;
    receiving a number of RACH opportunities associated with a helper cell baseline parameter configuration; and
    determining a number of RACH opportunities for the particular helper cell based on the received numbers of RACH opportunities.

7. The method of claim 3, where reconfiguring a RACH power control parameter comprises:
    receiving a number of power control parameters associated with the out of service cell;
    receiving a number of power control parameters associated with a helper cell baseline parameter configuration; and determining a number of power control parameters for the particular helper cell based on the received numbers of power control parameters.

8. The method of claim 3, where one or more of the preamble, the preamble format, the RACH opportunity, or the RACH power control parameter are pre-determined by the device, and the method further comprises:

providing one or more of the pre-determined preamble, the pre-determined preamble format, the pre-determined RACH opportunity, or the pre-determined RACH power control parameter to the particular helper cell.

9. The method of claim 8, further comprising:

receiving an altered RACH parameter configuration associated with the out of service altering one or more of the pre-determined preamble, the pre-determined preamble format, the pre-determined RACH opportunity, or the pre-determined RACH power control parameter based on the altered RACH parameter configuration; and providing one or more of the altered pre-determined preamble, the altered pre-determined preamble format, the altered pre-determined RACH opportunity, or the altered pre-determined RACH power control parameter to the particular helper cell.

10. A method in a radio network that includes a first device associated with an out of service cell and a second device associated with a helper cell, the method comprising:

triggering, via the first device, a random access channel (RACH) parameters reconfiguration for the second device;

providing, to the second device, a current RACH parameters configuration associated with the first device;

calculating, via the second device, the RACH parameters reconfiguration based on the current RACH parameters configuration associated with the first device; and implementing the RACH parameters reconfiguration to enable user equipment provided in the out of service cell to communicate with the radio network, via the helper cell, where calculating, via the second device, the RACH parameters reconfiguration comprises:

reallocating a preamble associated with the RACH parameters reconfiguration;

selecting a preamble format associated with the RACH parameters reconfiguration;

selecting a RACH opportunity associated with the RACH parameters reconfiguration;

reconfiguring a RACH power control parameter associated with the RACH parameters reconfiguration.

11. A device in a radio network that includes cells, the device comprising:

a memory to store a plurality of instructions; and a processor to execute instructions in the memory to:

obtain a service change associated with a cell in the radio network, identify helper cells in the radio network that need new random access channel (RACH) parameters due to the service change, determine a RACH parameters configuration for the helper cells, configure the helper cells with the determined RACH parameters configuration, receive information indicating that the cell is out of service, and trigger a RACH parameters reconfiguration for a particular helper cell based on the received information, where, when triggering a RACH parameters reconfiguration, the processor further executes instructions in the memory to:

receive neighbor cell relation lists associated with cells adjacent to the out of service cell, receive mobility statistics associated with the out of service cell, determine the particular helper cell based on the neighbor cell relation lists and the mobility statistics, receive a RACH parameters configuration for the out of service cell, and determine reconfigured RACH parameters, corresponding to extended coverage of the helper cell, based on the RACH parameters configuration and the determined helper cell.

12. A device in a radio network that includes cells, the device comprising:

a memory to store a plurality of instructions; and a processor to execute instructions in the memory to:

obtain a service change associated with a cell in the radio network, identify helper cells in the radio network that need new random access channel (RACH) parameters due to the service change, determine a RACH parameters configuration for the helper cells, configure the helper cells with the determined RACH parameters configuration, reallocate a preamble associated with the RACH parameters reconfiguration, select a preamble format associated with the RACH parameters reconfiguration, select a RACH opportunity associated with the RACH parameters reconfiguration, and reconfigure a RACH power control parameter associated with the RACH parameters reconfiguration.

13. The device of claim 12, where, when reallocating a preamble, the processor further executes instructions in the memory to:

receive a cyclic shift associated with the out of service cell, receive a cyclic shift associated with a helper cell baseline parameter configuration, determine a reconfigured cyclic shift for the particular helper cell based on the received cyclic shifts, receive a root sequence cubic metric associated with the helper cell baseline parameter configuration, receive a root sequence cubic metric associated with an out of service cell parameter configuration, determine a root sequence cubic metric for the particular helper cell based on the received root sequence cubic metrics, receive a high speed mode of root sequences in the helper cell baseline parameter configuration, receive a high speed mode of root sequences in the out of service cell parameter configuration, and determine a root sequence for the particular helper cell based on the received high speed modes.

14. The device of claim 12, where, when selecting a preamble format, the processor further executes instructions in the memory to:

receive a cyclic prefix length of a preamble format associated with a helper cell baseline parameter configuration, receive a cyclic prefix length of a preamble format associated with an out of service cell parameter configuration, determine a cyclic prefix length of the preamble format for the particular helper cell based on the received cyclic prefix lengths, receive a repeated preamble associated with the helper cell baseline parameter configuration, receive a repeated preamble associated with the out of service cell parameter configuration, and determine a repeated preamble for the particular helper cell based on the received repeated preambles.

15. The device of claim 12, where, when selecting a RACH opportunity, the processor further executes instructions in the memory to:

receive a number of RACH opportunities associated with the out of service cell, receive a number of RACH opportunities associated with a helper cell baseline parameter configuration, and determine a number of RACH opportunities for the particular helper cell based on the received numbers of RACH opportunities.

16. The device of claim 12, where, when reconfiguring a RACH power control parameter, the processor further executes instructions in the memory to:

receive a number of power control parameters associated with the out of service cell, receive a number of power control parameters associated with a helper cell baseline parameter configuration, and determine a number of power control parameters for the particular helper cell based on the received numbers of power control parameters.

17. The device of claim 12, where one or more of the preamble, the preamble format, the RACH opportunity, or the RACH power control parameter are pre-determined by the device, and the processor further executes instructions in the memory to:

provide one or more of the pre-determined preamble, the pre-determined preamble format, the pre-determined RACH opportunity, or the pre-determined RACH power control parameter to the particular helper cell.

18. The device of claim 17, where the processor further executes instructions in the memory to:

receive an altered RACH parameter configuration associated with the out of service cell, alter one or more of the pre-determined preamble, the pre-determined preamble format, the pre-determined RACH opportunity, or the pre-determined RACH power control parameter based on the altered RACH parameter configuration, and provide one or more of the altered pre-determined preamble, the altered pre-determined preamble format, the altered pre-determined RACH opportunity, or the altered pre-determined RACH power control parameter to the particular helper cell.

19. The device of claim 12, where the processor further executes instructions in the memory to:

provide, to the particular helper cell, one or more of the preamble, the preamble format, the RACH opportunity, or the RACH power control parameter to enable user equipment provided in the out of service cell to communicate with the radio network, via the particular helper cell.

* * * * *

UNITED STATES PATENT AND TRADEMARK OFFICE
CERTIFICATE OF CORRECTION

PATENT NO. : 8,095,143 B2  
APPLICATION NO. : 12/371083  
DATED : January 10, 2012  
INVENTOR(S) : Amirijoo et al.

It is certified that error appears in the above-identified patent and that said Letters Patent is hereby corrected as shown below:

In Column 6, Line 2, delete "($P_{O\ RACH}$);" and insert -- ($P_{O\_RACH}$); --, therefor.

In Column 25, Line 64, in Claim 3, delete "Network;" and insert -- network; --, therefor.

In Column 27, Line 15, in Claim 9, delete "service" and insert -- service cell; --, therefor.

Signed and Sealed this  
Seventh Day of August, 2012

David J. Kappos  
*Director of the United States Patent and Trademark Office*